(12) United States Patent
Chen

(10) Patent No.: US 10,321,543 B2
(45) Date of Patent: Jun. 11, 2019

(54) SECURITY LIGHT WITH LIFESTYLE SOLUTIONS

(71) Applicant: Vaxcel International Co., Ltd., Carol Stream, IL (US)

(72) Inventor: Chia-Teh Chen, Taipei (TW)

(73) Assignee: VAXCEL INTERNATIONAL CO., LTD., Carol Stream, IL (US)

( * ) Notice: Subject to any disclaimer, the term of this patent is extended or adjusted under 35 U.S.C. 154(b) by 0 days.

(21) Appl. No.: 16/152,436

(22) Filed: Oct. 5, 2018

(65) Prior Publication Data

US 2019/0045602 A1 Feb. 7, 2019

Related U.S. Application Data

(63) Continuation of application No. 15/958,660, filed on Apr. 20, 2018, now Pat. No. 10,129,957, which is a continuation of application No. 15/646,620, filed on Jul. 11, 2017, now Pat. No. 9,980,348, which is a continuation of application No. 15/415,964, filed on Jan. 26, 2017, now Pat. No. 9,743,495, which is a continuation of application No. 15/270,490, filed on Sep. 20, 2016, now Pat. No. 9,596,735, which is a continuation of application No. 15/131,448, filed on (Continued)

(51) Int. Cl.
*H05B 33/08* (2006.01)
*H05B 37/02* (2006.01)
*G08B 5/36* (2006.01)

(52) U.S. Cl.
CPC ..... *H05B 37/0227* (2013.01); *H05B 33/0842* (2013.01); *H05B 37/0218* (2013.01); *H05B 37/0272* (2013.01); *H05B 37/0281* (2013.01);

*G08B 5/36* (2013.01); *Y02B 20/40* (2013.01); *Y02B 20/42* (2013.01); *Y02B 20/46* (2013.01)

(58) Field of Classification Search
CPC ................ H05B 37/02; H05B 37/0218; H05B 37/0227; H05B 37/0272; H05B 37/0281; H05B 33/08; H05B 33/0833; H05B 33/0842; G08B 5/36; Y02B 20/40; Y02B 20/42; Y02B 20/46
USPC .... 315/149, 151–159, 209 R, 291, 307, 308, 315/312
See application file for complete search history.

(56) References Cited

U.S. PATENT DOCUMENTS

| 5,442,177 A | 8/1995 | Boulos et al. |
| 5,598,066 A | 1/1997 | Wiesemann et al. |
| 5,699,243 A | 12/1997 | Eckel et al. |

(Continued)

*Primary Examiner* — Jimmy T Vu
(74) *Attorney, Agent, or Firm* — Li & Cai Intellectual Property (USA) Office

(57) ABSTRACT

A lifestyle LED lighting solution configured with a timer to convert from performing a first illumination mode to performing a second illumination mode at a preset time point controlled by the timer, wherein the first illumination mode and the second illumination mode are designed to perform different lighting characteristics including a light intensity and a light color temperature. The first illumination mode is a general illumination mode while the second illumination mode is an energy saving mode. The timer can be an anytime setting timer, a fixed time point timer, a fixed time period timer or a clock timer. The anytime setting timer is also usable for replacing a photo sensor to automatically turn on and turn off an LED light. The clock timer can be used for controlling on/off performance of the LED light according to a clock time schedule.

84 Claims, 12 Drawing Sheets

Related U.S. Application Data

Apr. 18, 2016, now Pat. No. 9,480,129, which is a continuation of application No. 13/974,445, filed on Aug. 23, 2013, now Pat. No. 9,351,373.

(56) References Cited

U.S. PATENT DOCUMENTS

| | | | |
|---|---|---|---|
| 5,747,937 | A | 5/1998 | Wiesemann et al. |
| 5,946,209 | A | 8/1999 | Eckel et al. |
| 6,225,748 | B1 | 5/2001 | Evans et al. |
| 6,548,967 | B1 | 4/2003 | Dowling et al. |
| 6,820,998 | B2 | 11/2004 | Chen |
| 6,925,741 | B2 | 8/2005 | Eloo et al. |
| 7,122,976 | B1 | 10/2006 | Null et al. |
| 7,268,497 | B2 | 9/2007 | Hsieh |
| 7,271,543 | B1 | 9/2007 | Goldstein |
| 7,339,471 | B1 | 3/2008 | Chan et al. |
| 7,405,524 | B2 | 7/2008 | Null et al. |
| 7,586,271 | B2 | 9/2009 | Shuy |
| 8,035,513 | B2 | 10/2011 | Raper |
| 8,461,778 | B2 | 6/2013 | Mohan et al. |
| 8,755,039 | B2 | 6/2014 | Ramer et al. |
| 9,035,769 | B2 | 5/2015 | Steiner et al. |
| 2007/0217404 | A1* | 9/2007 | Kawamata ............. H05B 37/02 370/360 |
| 2008/0278934 | A1 | 11/2008 | Maldonado |
| 2009/0278479 | A1 | 11/2009 | Platner et al. |
| 2011/0043133 | A1 | 2/2011 | Van Laanen et al. |
| 2012/0112667 | A1 | 5/2012 | Mohan et al. |
| 2012/0206051 | A1 | 8/2012 | Nieuwlands et al. |
| 2014/0009081 | A1* | 1/2014 | Fujiwara ................ H02M 1/08 315/224 |
| 2014/0252961 | A1 | 9/2014 | Ramer et al. |

* cited by examiner

| Brand | $V_F$ Min. | $V_F$ Max. | Product Series | Information Source |
|---|---|---|---|---|
| CREE | 2.9V | 3.3V | J Series LEDs/J Series 2835 | www.cree.com/led-components/products/j2835/jseries-2835 |
| LUMILEDS | 2.7V | 3.3V | LUXEON 2835 Line | www.lumileds.com/luxeon2835line |
| SAMSUNG | 2.9V | 3.3V | KM281BA+ | www.samsung.com/app/components/products/j2835/jseries-2835 |
| OSRAM | 2.7V | 3.3V | DURIS® E/DURISR E 2835 | www.osram.com/app/product_selector/#!?query=DORIS%20E%202835&sortField=&sortOrder=&start-0&filters=productbrand,DORIS,E&filters-productbrand,DORIS |

FIG.7

SECURITY LIGHT WITH LIFESTYLE SOLUTIONS

CROSS-REFERENCE TO RELATED APPLICATIONS

This Application is a continuation application of prior application Ser. No. 15/958,660 filed on Apr. 20, 2018, the entire contents of which are incorporated herein by reference. The application Ser. No. 15/958,660 is a continuation application of prior application Ser. No. 15/646,620 filed on Jul. 11, 2017, now U.S. Pat. No. 9,980,348 B2. The application Ser. No. 15/646,620 is a continuation application of prior application Ser. No. 15/415,964 filed on Jan. 26, 2017, now U.S. Pat. No. 9,743,495 B2. The application Ser. No. 15/415,964 is a continuation application of prior application Ser. No. 15/270,490 filed on Sep. 20, 2016, now U.S. Pat. No. 9,596,735 B2. The application Ser. No. 15/270,490 is a continuation application of prior application Ser. No. 15/131,448 filed on Apr. 18, 2016, now U.S. Pat. No. 9,480,129 B2. The application Ser. No. 15/131,448 is a continuation application of prior application Ser. No. 13/974,445 filed on Aug. 23, 2013, now U.S. Pat. No. 9,351,373 B2.

FIELD OF THE INVENTION

The present invention relates to a management technology for operating lighting devices; in particular to some humanized techniques to perform a programmable delay time management and the application thereof.

DESCRIPTION OF RELATED ART

The use of motion sensor to enable a lamp to perform a transient illumination is a well-known technology. Generally, there are two purposes for the need of a transient illumination by using a motion sensor. The first purpose is for energy saving wherein the light source is enabled only when the user enters the detection zone. The second purpose is for threatening intruders by using an instant extreme variation of luminance to achieve the objective of security guard. The drawback of the lighting device with the above-mentioned motion sensor is that the lighting device would keep in inactivated state and the environment would be dark when user is not in the detection range of the motion sensor. User is therefore not able to recognize the direction or the location of destination. In order to overcome the above-mentioned drawbacks, a lighting device with a motion sensor to perform two-level lighting was invented in U.S. Pat. No. 5,747,937 which enables a lamp to perform a low level illumination at nightfall and when a person or an animal enters the sensing range of the motion sensor the lamp is instantly activated to perform a high level illumination. Thus, when the user is outside the detection range, he or she can still see the ambient low level illumination to get a sense of direction or location of destination. Furthermore, a two-level security lighting device providing a timed illumination was invented in U.S. Pat. No. 7,339,471 B1 which enables a lamp at the onset of nightfall to perform an accent illumination for a time period and the lamp is illuminated at increased brightness when activated by a motion sensor, wherein the time length of the accent illumination can be automatically adjusted for different nighttimes due to seasonal effect when the lighting device is operated under a solar tracking mode.

The aforementioned two-level security lighting devices are a compromised solution between illumination need and security function throughout the night time. As a matter of fact and from the perspective of lifestyle living, the two-level security lamps in U.S. Pat. Nos. 5,747,937 and 7,339,471 B1 have ignored the different needs of illumination versus security function along the time frame during the night period. In early evening the general illumination is more needed than the security function, while in late evening the security function is more needed than the general illumination. The present invention is designed to offer an improvement over the drawback of the aforementioned two-level solutions, such that the lamp works as a general flood light with full illumination capacity for a preset time period in early evening when people are active before it is converted to a motion sensor activated security lighting in late evening when people are ready to go sleeping. Such hybrid configuration offers many choices of lifestyle lightings which optimizes the functional utilization of a lighting device for both general illumination and security guard during the course of nighttime period. This life style lighting solution would become even more meaningful with the increasing popularity of the LED bulbs which consumes very low energy at full-power illumination in early evening time and also serves perfectly as a security light to warn intruders in late evening time. Consumers will be pleased to see their outdoor space fully illuminated at low energy cost in the early evening time while enjoy or show off the beautiful and romantic scenery of their houses and landscapes. It is rather interesting to compare the present invention with LED bulbs to the two-level halogen security lamp per U.S. Pat. No. 5,747,937 which when operating at low level still consumes as much as 35 watts to 40 watts while our present invention consumes only 10 watts to 15 watts even at full-power illumination for the time period of early evening.

SUMMARY OF THE INVENTION

The objective of the present invention is to provide house owners a lifestyle lighting solution catering to their living habits. In the present invention a lighting device is provided, wherein the nighttime illumination of the lighting device is divided into two stages, with the first stage being a full-power illumination and the second stage being a power-saving/security illumination. The time point that the lighting device is changed from a full-power illumination to a power-saving illumination is the conversion time point, and such a conversion time point is creatively and uniquely designed to be programmable by the users according to their living needs. The technology also offers selection of different time periods for performing the full-power illumination before the lighting device being converted to the power-saving/security illumination.

In order to achieve the aforementioned objective, according to an embodiment of the present invention, a lighting device is provided which has two working modes selectable by the user, wherein the first working mode is a dusk-dawn mode, in which the lighting device is automatically turned on at dusk with a full-power illumination, and the same high level illumination continues until the lighting device is automatically turned off at dawn; wherein the second working mode is a lifestyle mode, in which the lighting device is automatically turned on at dusk to perform a full-power illumination for a preset time period and at a conversion time point the lighting device is switched from the full-power illumination to perform a power-saving illumination until daybreak. The time length of the preset time period is dependent on the conversion time point which is variable or programmable by appropriate means according to the user's need.

According to an embodiment of the present invention, a lighting device is constructed at least with a photo sensor, a motion sensor and a microcontroller such that the lighting device is automatically turned on at dusk and turned off at dawn by the photo sensor, wherein during the course of nighttime the lighting device performs two stages of illumination controlled by the microcontroller in such a manner that a timer embedded in the microcontroller is configured to set a conversion time point and to control a full-power illumination or high power illumination for a desired preset time period before being converted to a power-saving and security illumination in response to the motion sensor.

The present invention discloses a lifestyle lighting solution by configuring a timer in the microcontroller with at least three methods to set the conversion time point, which are:
  (1) the anytime setting, in which the user selects a conversion time point for the lighting device by giving a trigger signal to the microcontroller, wherein the microcontroller recognizes the trigger signal and reacts at the moment of the selected time point by promptly converting the light performance from the full-power illumination to a power-saving or security illumination, and at the same time stores this selected time point in its memory for repetitive performance at this selected conversion time point on a daily basis until another trigger signal being given by the user to change the timer configuration;
  (2) the fixed time point setting, in which the timer of the microcontroller is programmed to be capable of tracing the nighttime shift due to seasonal effect wherein the timer of the microcontroller dynamically controls the duration of the full-power illumination so that the lighting device can switch by itself at a fixed time point from the full-power illumination to a power-saving or security illumination;
  (3) the fixed time period setting, in which the timer has a fixed time count so that the lighting device illuminates with full power for a constant time period before being converted to a power-saving or security illumination.

When the timer is configured by the fixed time point setting, the microcontroller with its program codes performs an automatic time shift detection to measure the seasonal time shift of dusk and dawn so as to dynamically adjust the time length of the preset time period for performing full-power illumination. Consequently, when the timer is configured to be compliant with seasonal time shift, the conversion time point is fixed to counteract the seasonal daytime variation. The advantage of the present invention is obvious. For instance, if in autumn season with sunset at 6 p.m., a house owner selects a three-hour period for performing a full-power illumination in early evening, the lighting device will be converted to a power-saving or security illumination year round at 9 a.m. which is a fixed conversion time point without being affected by the seasonal time shift of dusk and dawn. In the absence of such an automatic capability to detect seasonal time shift and when in winter season, the lighting device will be automatically turned on at around 4:30 p.m. (sunset time) and then be converted to a power-saving illumination at 7:30 p.m. which is too early according to our living habit. This automatic adjustment of the time period in performing full-power illumination also works well in extreme places like Greenland or Iceland.

The present invention discloses a security lighting device which provides at least the following variations to perform the second stage or security illumination after the conversion time point, which are:
  (1) Complete cutoff; the lighting device is turned off completely at the conversion time point through the rest of nighttime and at dawn the lighting device is reset to enter a new cycle of repetitive performance. Thus, at dusk the lighting device is again turned on automatically to perform a full-power illumination for a preset time period and at the same conversion time point is again turned off completely accordingly.
  (2) Low level illumination; the lighting device is switched to a low level illumination throughout the rest of nighttime. At dawn the lighting device is turned off and reset to enter a new cycle of repetitive performance. Thus, at dusk the lighting device is again automatically turned on to perform a full-power illumination and continues until reaching the same conversion time point at which the lighting device is switched to a low level illumination accordingly.
  (3) Complete cutoff coupled with motion sensor activated illumination; the lighting device is switched to complete cutoff at the conversion time point and at the same time enters a standby status to await the detection signal from the motion sensor. When a body motion is detected, the motion sensor activates the lighting device to perform a full-power illumination only for a short time period until the motion detection signal disappears. At dawn the lighting device is reset to enter a new cycle of repetitive performance. Thus, at dusk the lighting device is automatically turned on and continues until reaching the conversion time point at which the lighting device is switched to complete cutoff and enters a standby status to await the detection signal from the motion sensor accordingly.
  (4) Low level illumination coupled with motion sensor activated illumination; at the conversion time point the lighting device is switched to a low level illumination and at the same time enters a standby status to await the detection signal from the motion sensor. Whenever a body motion is detected, the motion sensor activates the lighting device to perform a full-power illumination only for a short time period until the motion detection signal disappears. At dawn the lighting device is reset to enter a new cycle of repetitive performance. Thus, at dusk the lighting device is automatically turned on for a full-power illumination and continues until reaching the conversion time point at which the lighting device is switched to a low level illumination and enters a standby status to await the detection signal from the motion sensor accordingly.

To make the lighting device of the present invention even more user friendly, the present invention also provides home owners additional solution of being able to choose different working modes designed in at different time or on different occasions. For example, in a multi-mode lighting device wherein two or three working modes are built into one single lighting device using the microcontroller technology, the user can select one of the multi-modes for performance by using a control signal to alternately change the working mode or using control signals of different format and different binary patterns to activate corresponding working modes. The multi-modes always includes a basic dusk-dawn mode and the above mentioned lifestyle security modes for user's selection and the high power illumination mode.

The present invention further provides a lighting device constructed with a motion sensor and a microcontroller such that instead of using a photo sensor the lighting device is automatically turned on at dusk and turned off at dawn by the program codes of the microcontroller, wherein during the course of nighttime the lighting device has at least two working modes selectable by the users. In order to perform the aforementioned lifestyle mode without using photo sensor, the user takes an initial setting process to input at least three time parameters to the microcontroller, namely a first preset time point to turn on the lighting device for a full-power illumination, a second preset time point to convert to power-saving/security illumination which being coupled with the motion sensor and a third preset time point to turn off the lighting device and at the same time to reset the microcontroller for the next 24 hours performance cycle. Such lifestyle mode without reliance on a photo sensor enables the users to manage their time table of lighting performance for both indoor and outdoor applications.

The light sources of the present invention can be incandescent lamps, fluorescent lamps, AC LED modules or DC LED bulbs. According to the embodiments of the present invention, the two-level illumination performance can be achieved either by dimming a single light source load or by using a double-load construction with a low-wattage and a high-wattage light source load such that the high-wattage light source load is always activated by the motion sensor and the low-wattage light source load is automatically turned on and off with or without the photo sensor. The lighting device with lifestyle illumination management is therefore different from the dusk to dawn lighting devices and the traditional motion sensor activated security lighting apparatuses. The present invention offers a versatile solution to users to manage their night illumination according to their life styles and living habits.

To sum up, the lighting device with programmable timer technology to dynamically control full-power illumination and power-saving illumination provided in an embodiment of the present invention integrates multi luminance functions into one single construction without resorting to complex hardware, wherein design concept with humanized considerations is adopted.

In order to further the understanding regarding the present invention, the following embodiments are provided along with illustrations to facilitate the disclosure of the present invention.

BRIEF DESCRIPTION OF THE DRAWINGS

FIG. 7 is a data sheet showing the minimum forward voltages and maximum forward voltages collected from various LED manufacturers.

DETAILED DESCRIPTION OF THE PREFERRED EMBODIMENTS

The aforementioned illustrations and following detailed descriptions are exemplary for the purpose of further explaining the scope of the present invention. Other objectives and advantages related to the present invention will be illustrated in the subsequent descriptions and appended drawings.

Figure 1:
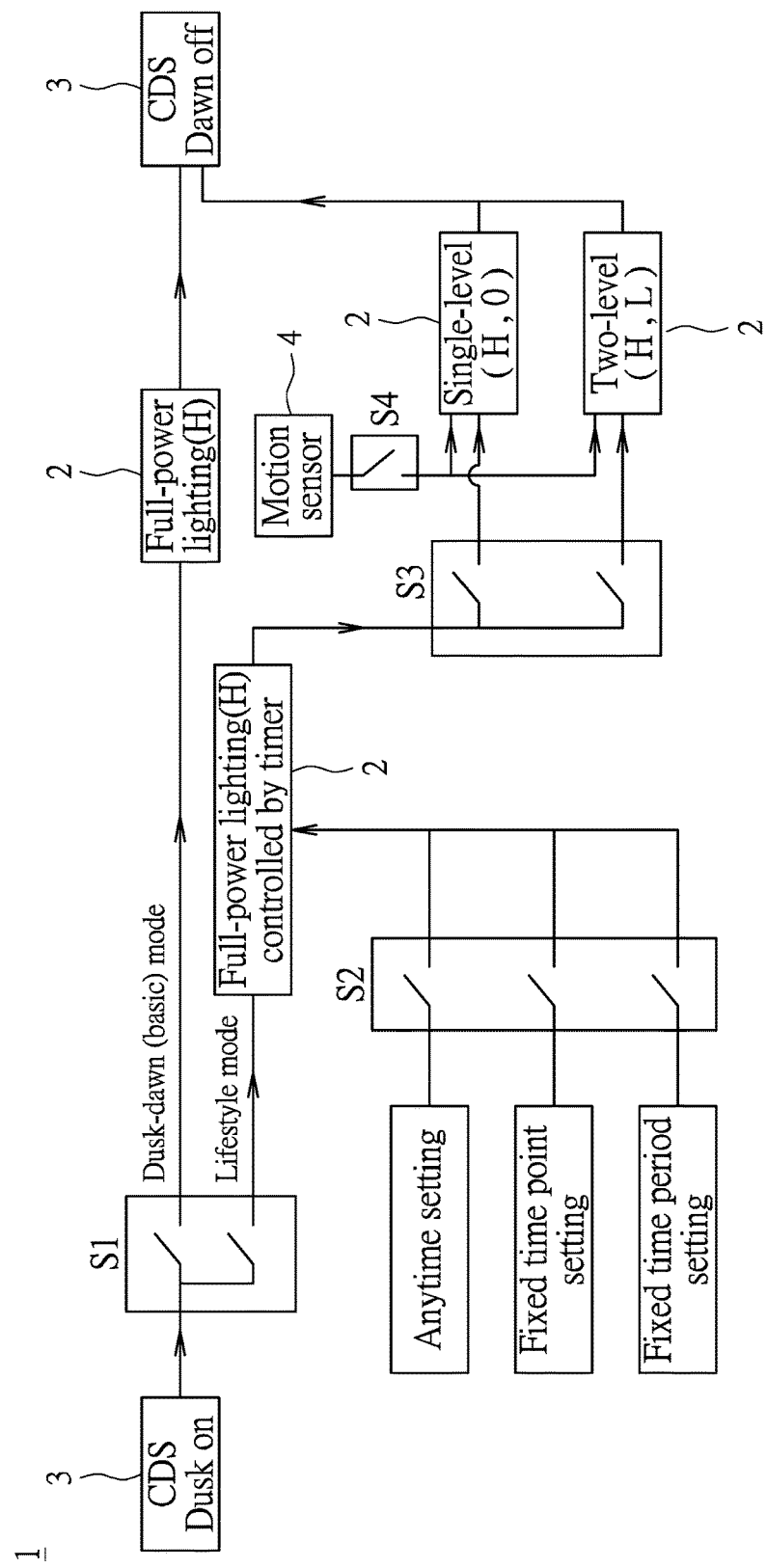
FIG. 1 schematically shows a block diagram depicting the operation principle of the lifestyle lighting device according to various embodiments of the present invention.

FIG. 1 shows a block diagram depicting the operation principle of a lifestyle lighting device according to various embodiments of the present invention. Referring to FIG. 1, a lighting device 1 of the present invention is composed basically of a controller unit 2, functional selection switches S1-S4 and sensor elements 3, 4, together with light source loads and electric power unit not depicted here. As a basic operation, a lighting device 1 is enabled at dusk and disabled at dawn by using a photo sensor (CDS) 3 to detect daylight and to control electric power supply to the lighting device 1. This basic operation is referred to as dusk-dawn mode. According to FIG. 1, the lighting device 1 includes a dusk-dawn mode and a lifestyle mode, wherein a mode selection switch S1 is provided in the lighting device 1 to choose different operation mode.

When operating 51 to select the dusk-dawn mode, the lighting device 1 is turned on automatically at dusk to perform a full-power illumination or high power illumination controlled by the controller unit 2, and the same high level illumination continues until the lighting device 1 is automatically turned off at dawn, and the lighting device 1 is reset to enter a new operation cycle on a daily basis; by operating S1 to select the lifestyle mode, the lighting device 1 is turned on automatically at dusk to perform a full-power illumination for a preset time period until reaching a conversion time point, at which the lighting device 1 is converted to a power-saving or security illumination controlled by the controller unit 2, and the security illumination continues until the lighting device 1 is automatically turned off at dawn, and the lighting device 1 is reset to enter a new operation cycle on a daily basis.

The lifestyle mode is characterized by a full-power illumination lasting for a preset time period which is measured between the turn-on time point of the lighting device at dusk and the conversion time point controlled by a virtual timer in the controller unit 2. Referring to FIG. 1, a functional switch S2 is provided in the lighting device 1 in order to set the conversion time point or the preset time period by at least three methods, which are: (1) the anytime setting, for selecting an arbitrary conversion time point by the user; (2) the fixed time point setting, for enabling the lighting device 1 to have a conversion time point without being affected by seasonal effect; and (3) the fixed time period setting, for selecting a constant time period. More details regarding each setting method will be described later with the help of circuit diagrams. In short, the illumination performance of the lifestyle lighting device 1 during the course of nighttime is divided by a conversion time point into two stages, with the first stage being a full-power illumination and the second stage being a power-saving or security illumination controlled by the controller unit 2. The conversion time point which is dynamically variable or programmable according to the user's demand is the key technology for the lifestyle lighting solutions.

The lighting device 1 furthermore provides four options for the second stage power-saving or security illumination in order to extend its utility. As depicted in FIG. 1, a functional switch S3 is introduced for this purpose. The lighting device 1 can perform at the second stage with one of the two illumination types selectable by operating a functional switch S3, which are:

(1) Complete cutoff (0), wherein at the conversion time point the lighting device 1 is turned off completely through the rest of nighttime. At dawn, the lighting device 1 is reset to enter a new cycle of repetitive performance;

(2) Low level illumination (L), wherein at the conversion time point the lighting device 1 is switched to perform a low level illumination, generally at 30% or less of the full-power illumination. The low level illumination continues through the rest of nighttime. At dawn, the lighting device 1 is reset to enter a new cycle of repetitive performance.

Moreover, referring to FIG. 1, a functional switch S4 is connected to a motion sensor 4. When the switch S4 is short-circuited, the motion sensor 4 is coupled to the controller unit 2 and the lighting device 1 can perform at the second stage with one of the other two illumination types selectable by operating the switch S3 as depicted in FIG. 1, which are:

(3) Complete cutoff coupled with motion sensor activated illumination (H, 0), wherein the lighting device 1 is turned off completely at the conversion time point and at the same time enters a standby status to await the detection signal from the motion sensor 4. When a body motion is detected, the lighting device 1 reacts by changing its illumination from off-state (0) to a full-power illumination (H) for a short time period and then returns to the standby status with a complete off state. This illumination type is also referred to as a motion sensor activated single-level illumination which continues until dawn. At dawn, the lighting device 1 is reset to enter a new cycle of repetitive performance;

(4) Low level coupled with motion sensor activated illumination (H, L), wherein at the conversion time point the lighting device 1 is switched to perform a low level illumination, generally at 30% or less of the full-power illumination, and at the same time enters a standby status to await the detection signal from the motion sensor 4. When a body motion is detected, the lighting device 1 reacts by changing its performance from a low level illumination (L) to a full-power illumination (H) for a short time period and then returns to the standby status with a low level illumination. This illumination type is also referred to as a motion sensor activated two-level illumination which continues until dawn. At dawn, the lighting device 1 is reset to enter a new cycle of repetitive performance.

Based on the operation principle depicted in FIG. 1, the lighting device 1 of the present invention has three variations in time period setting for performing the full-power illumination and four variations in illumination types of the power-saving or security illumination. The lighting device 1 offers therefore twelve different combinations of lifestyle lighting solutions or lifestyle lighting management for indoor and outdoor applications. It provides flexibility for designing lifestyle solutions by combining an appropriate numbers of the aforementioned variations into a lighting device. For instance, a lighting device can be so constructed without a photo sensor such that it is turned on manually by operating a wall switch, performs at the first stage a full-power illumination for a fixed time period and then at the second stage a motion sensor activated single-level illumination.

Referring to FIG. 1, according to various embodiments of the present invention, the operation of the lighting device 1 is automatically conducted by the controller unit 2 in response to the sensor elements 3, 4 to perform a lifestyle illumination which is divided into two stages during the course of entire nighttime. The controller unit 2 is responsible for a lifestyle solution wherein parameters for different timed illuminations are preset and programmed through the functional selection switches S1-S4 which are also referred to as external control units or external control means. In practice, the controller unit 2 has an internal timer circuit to perform different timed illuminations. The external control units S1-S4 can be constructed in form of electronic or mechanical means to generate external control signals to perform function selection or timer setting for the controller unit's operation, wherein the external control signals can be in form of constant voltage or a binary voltage signal with a low and a high voltage recognizable by the controller unit 2 to change the working mode or to activate corresponding timer circuit setting.

Figure 2:
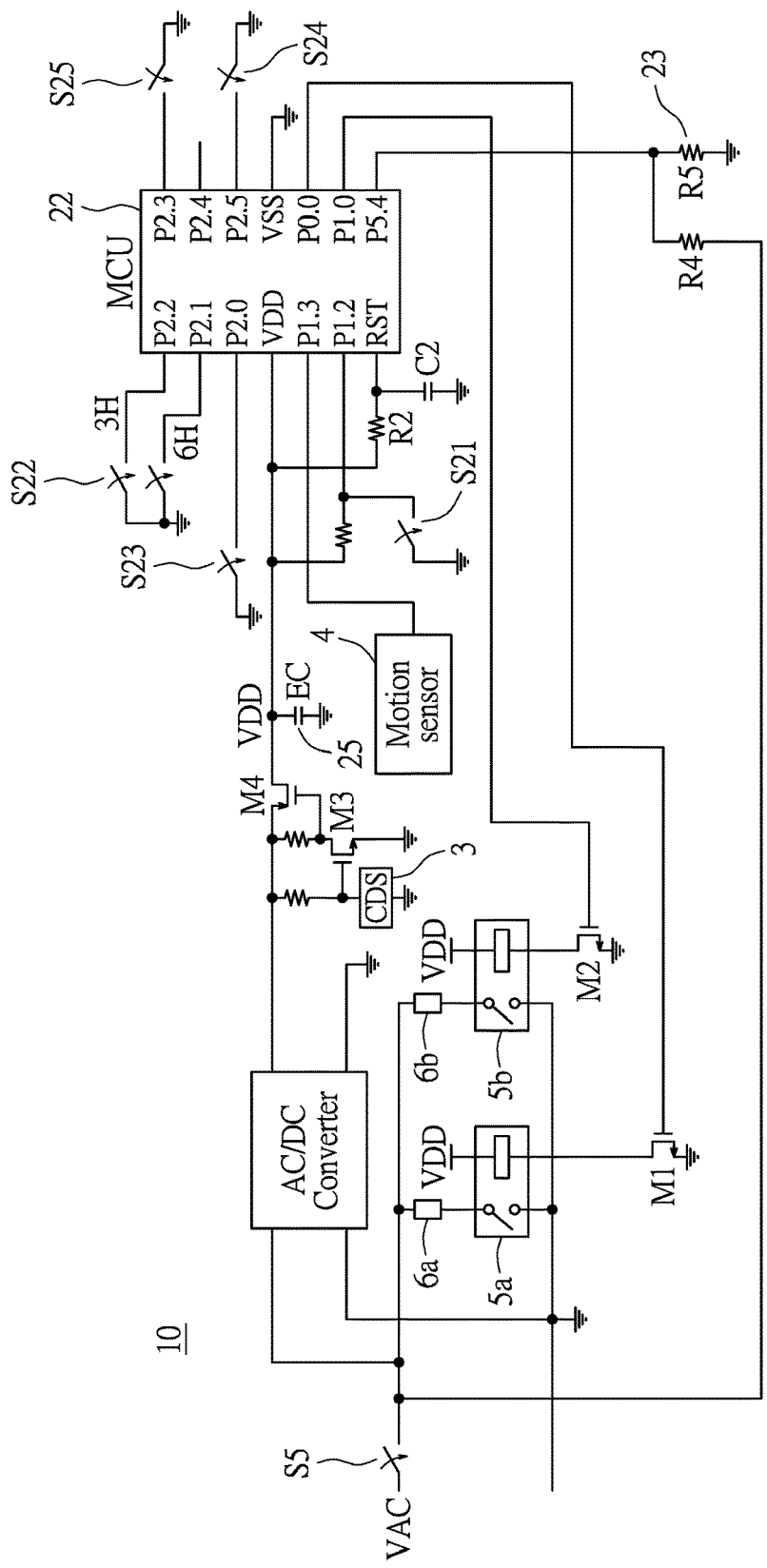
FIG. 2 schematically shows a circuit diagram depicting the lighting device to perform lifestyle lighting by controlling relays to transmit electric power to two light source loads according to an embodiment of the present invention.

Referring to FIG. 1 and FIG. 2, FIG. 2 shows schematically a circuit diagram for technically implementing a lighting device 1 according to FIG. 1 of an embodiment of the present invention. In FIG. 2, a conventional AC/DC converter generates a DC voltage VDD as the working voltage for the lighting device 10. A photo sensor CDS 3 is provided to detect daylight and to control the supply of VDD to the lighting device 10. In the daytime, because the photo sensor 3 has a small resistance, the NMOS transistor M3 is turned off and simultaneously the PMOS transistor M4 is turned off completely to prohibit supplying VDD to the lighting device 10. In the nighttime, because the photo sensor 3 has a large resistance, the NMOS transistor M3 is turned on and simultaneously the PMOS transistor M4 is turned on heavily to supply VDD to the lighting device 10. Therefore, the lighting device 10 is automatically enabled at dusk and disabled at dawn by the photo sensor 3. At dusk the lighting devices 10 begins to work. Referring to FIG. 2, the lighting device 10 has a microcontroller 22 as the controller unit 2 to control the electric conduction state of the relay modules 5a, 5b for transmitting electric power to the light source loads 6a, 6b, respectively. The microcontroller 22 incorporating with a photo sensor 3 and a motion sensor 4 controls the illumination of the light source loads 6a, 6b to perform one of two working modes, which are dusk-dawn mode and lifestyle mode. In the lifestyle mode the microcontroller 22 performs illumination divided into two stages according to proper settings of a delay timer in the microcontroller.

In the following, the description is referred to the lighting device 10 being enabled by the photo sensor 3 through the entire nighttime. Referring to FIG. 2, the microcontroller 22 has the connection pins P0.0-P5.4 as input and output ports respectively to receive external control signals from the external control means S21-S25 and to deliver control voltages to a controllable switching unit consisting of the relay modules 5a, 5b to transmit electric power to the light source loads 6a, 6b.

Refer to FIG. 1 and FIG. 2. In FIG. 2, the working mode selection is done by operating the external control means S21 which, for instance, is a toggle switch with one end connected to the ground and with another end via a resistor connected to VDD and also connected directly with the pin P1.2 of the microcontroller 22. By short-circuiting S21 a zero voltage signal appears at P1.2, otherwise the pin P1.2 is held at a high voltage. The microcontroller 22 with its program codes scans constantly the electric potential at P1.2 for working mode decision. If a zero voltage is detected at P1.2, for instance, it is interpreted by the microcontroller 22 as an external control signal for dusk-dawn mode. The microcontroller 22 runs in response to the external control signal a subprogram to execute the dusk-dawn mode. At the dusk-dawn mode, the microcontroller 22 delivers automatically at nightfall through its two pins P0.0 and P1.0 a high voltage to turn on the NMOS transistors M1 and M2, wherein the two relay modules 5a,5b are short-circuited to transmit electric power to the two light source load 6a,6b such as to perform a full-power illumination; the full-power illumination is sustained by a high voltage at the pins P0.0 and P1.0 until daybreak when the working voltage VDD is cutoff by the photo sensor 3, wherein the microcontroller 22 is reset to enter a next operating cycle on a daily basis. The pin RST connected with resistor/capacitor R2/C2 is reserved for power reset when the microcontroller 22 starts its program on next day.

Referring to FIG. 2, the microcontroller 22 with its program codes scans the electric potential at P1.2 for working mode decision. If a high voltage is detected at P1.2, for instance, it is interpreted by the microcontroller as an external control signal for lifestyle mode. The microcontroller runs in response to the external control signal a subprogram to execute the lifestyle mode. In the lifestyle mode, the microcontroller 22 delivers automatically at nightfall through its two pins P0.0 and P1.0 a high voltage to turn on the transistors M1 and M2 and also simultaneously the two relay modules 5a, 5b, wherein the two light source load 6a, 6b are turned on to deliver a full-power illumination; the high voltage at the pins P0.0 and P1.0 is sustained for a preset time period controlled by a timer embedded in the microcontroller 22 until reaching a conversion time point, at which the microcontroller 22 with the pin P1.0 remaining at a high voltage, for instance, delivers however a zero voltage to the pin P0.0 to turn off the NMOS transistor M1 and hence also to turn off the corresponding light source load 6a, such that the lighting device 10 has its luminance changed from a full-power intensity to a lower power intensity which is referred as a power-saving illumination; the power-saving illumination continues until daybreak when the working voltage VDD is cutoff by the photo sensor 3, wherein the microcontroller 22 is reset to enter next operating cycle.

As mentioned previously, the lighting device with lifestyle solutions is characterized by a proper conversion time point or a proper preset time period for performing full-power illumination catering to user's living habits. Referring to FIG. 2, the microcontroller 22 has pins reserved for connecting with the external control means S22, S23 and 23 to receive external control signals or trigger signals for selecting method to set the conversion time point or the time period for performing full-power illumination, wherein the setting is made through configuring a virtual timer which is based on executing a long delay time subroutine of the microcontroller program codes or by using auxiliary counter for long time counting. For the lifestyle mode, the timer in the microcontroller 22 can be configured by at least three methods which are:

(1) the anytime setting,
(2) the fixed time point setting, and
(3) the fixed time period setting.

The anytime setting can be done, for instance, in a convenient way by manually operating a wall switch or a main power switch at any clock time when the user wants to choose a desired conversion time point, for instance, going to sleep. Referring to FIG. 2, a main power switch S5 connected between the lighting device 10 and an AC power VAC is used to do the anytime setting. To detect the anytime setting, a sampling circuit 23 consisting of resistors R4 and R5 is connected with one AC power line, wherein the sampling output is connected to a pin P5.4 of the microcontroller 22. When the AC power is shut down by operating the main switch S5, a zero voltage appears at the sampling circuit 23 and hence also at the pin P5.4. In FIG. 2, a large capacitor EC 25 is provided to hold VDD voltage for keeping the microcontroller 22 still in operation when the AC power is turned off momentarily. The anytime setting is accomplished when the user turns off momentarily and within a preset instant time interval, for instance, 1-2 seconds, turns back on the power switch S5 at a selected time point. If the microcontroller 22 with program codes scans constantly the electric potential at pins and detects at the pin P5.4 momentarily a zero voltage caused by this electric power disruption event, the microcontroller 22 recognizes it as an external trigger signal for the anytime setting. The microcontroller 22 reacts at the moment of receiving the trigger signal by promptly converting the lighting performance from a full-power illumination to a power-saving illumination and at the same time stores the selected time point information into its memory. The time point of the anytime setting serves as a new conversion time point for repetitive performance on a daily basis until another trigger signal or external control signal being received by the microcontroller.

Besides the aforementioned electric power disruption method, the anytime setting can also be done by operating an external control means, for instance, a toggle switch, which is connected between the ground and a pin of the microcontroller, not shown in FIG. 2. The anytime setting is triggered by the user at a desired conversion time point by momentarily short-circuiting the toggle switch, wherein a short-duration zero voltage appears at the pin of the microcontroller. At the moment when the user operates the toggle switch for the anytime setting by short-circuiting it and within a short time restoring it to open-circuit, the microcontroller 22 with program codes detects therefore at the pin connected with this toggle switch an instant zero voltage wherein the microcontroller 22 recognizes it as an external trigger signal for the anytime setting and reacts at the time point of receiving the trigger signal by promptly converting the lighting performance to a power-saving illumination and at the same time stores the selected time point information into its memory for repetitive performance on a 24-hours basis, as afore described.

The fixed time point setting is done by engaging an external control means connected to the microcontroller. Referring to FIG. 2, a toggle switch S23, for instance, serves as an external control means which is connected between one pin P2.0 of the microcontroller 22 and the ground. The fixed time point setting is selected by short-circuiting the switch S23, wherein a zero voltage appears at the pin P2.0. The microcontroller 22 with program codes scans constantly the electric potential at pins. If a zero voltage is detected at the pin P2.0, the microcontroller 22 interprets it as an external control signal for the fixed time point setting, wherein the microcontroller 22 runs a subroutine of the program codes to count a time delay $t_D$ for performing the full-power illumination, such that $$t_D = t_0 + (T-12)/2,$$

where $t_0$ is a constant in the subroutine, representing one of time lengths selectable to the users as the basis for making seasonal shift adjustment, T is a mean value of night time lengths collected from measurement of at least three consecutive days with the help of photo sensor 3 and processed by the program codes of the microcontroller. The fixed time point setting is valid for repetitively performing the lifestyle mode on a daily basis until other setting method is done by engaging proper external control means.

The fixed time point setting enables the microcontroller with its program codes to counteract the seasonal time shift of dusk and dawn so as to dynamically adjust the time length of the preset time period for performing a full-power illumination. For instance, a three-hour time period is normally preset in the subroutine, for which the constant $t_0=3$. If in spring season with sunset at 6 p.m., then T=12 for the nighttime, the lighting device will be converted to a power-saving or security illumination at 9 p.m. which is a conversion time point without being affected by the seasonal time shift of dusk and dawn. With the fixed time point setting, if in summer season with sunset at 8 p.m., then T=8 for the nighttime, $t_D=3+(-2)=1$, the lighting device will be converted to a power-saving or security illumination at 8 p.m.+$t_D$=9 p.m. ; if in winter season with sunset at 4 p.m., then T=16 for the nighttime, $t_D=3+(2)=5$, the lighting device will be converted to a power-saving or security illumination at 4 p.m.+$t_D$=9 p.m.. Consequently, when the timer program of the microcontroller is configured to be compliant with seasonal time shift, the conversion time point is fixed despite the seasonal daytime variation. This fixed time point setting is different from the method used in the prior art U.S. Pat. No. 7,339,471 B1 where the duration of illumination is determined based on a predetermined fraction of the recorded length of nighttime from previous night and consequently the time point of conversion may change during different seasons.

The fixed time period setting is done by engaging external control means connected to the microcontroller. Referring to FIG. 2, two toggle switches S22 serves as external control means which are respectively connected to pins P2.1 and P2.2 of the microcontroller 22 and the ground, for respectively setting 6-hour (6H) and 3-hour (3H) time period. The fixed time period setting is selected by short-circuiting one switch, for instance, the switch 6H, wherein a zero voltage appears at the pin P2.1. The microcontroller 22 with program codes scans constantly the electric potential at pins. If a zero voltage is detected at the pin P2.1, the microcontroller 22 interprets it as an external control signal for the fixed time period setting, wherein the microcontroller 22 runs a subroutine of the program codes to count a time period of 6 hours, such that the full-power illumination continues 6 hours before the lighting device 1 being converted to a power-saving illumination. By analogy, if a zero voltage is detected at the pin P2.2 when the toggle switch 3H is short-circuited, the microcontroller 22 runs a 3-hour delay time subroutine to enable a full-power illumination for 3 hours. The fixed time period setting is valid for repetitively performing the lifestyle mode on a daily basis until other setting method is done by engaging proper external control unit.

Refer to FIG. 1 and FIG. 2. In FIG. 2, when the lighting device 10 operates in the lifestyle mode by open-circuiting the mode selection switch S21, the illumination of the lighting device 10 is divided by a conversion time point into two stages, with the first stage being a full-power illumination and the second stage being a power-saving illumination. To make the security light versatile, the lighting device 10 of the present disclosure furthermore provides four options for the second stage energy-saving illumination by modifying the microcontroller program codes to take account additional external control signals which will be described as follows.

The four options at the second stage illumination can be done by using two light source loads 6a, 6b of different power levels and incorporating with a motion sensor 4. For instance, the load 6a is a high-wattage light source and 6b is a low-wattage one. In FIG. 2, a motion sensor 4 is connected to the pin P1.3 of the microcontroller 22. In addition, two toggle switches S24, S25 serve as external control means to make four different illumination types selectable by generating control signals respectively sent to the pins P2.3 and P2.5 of the microcontroller 22. The external control means S24, S25 can be so designed, for instance, S24 controls the coupling between the microcontroller 22 and the motion sensor 4, and S25 controls the illumination level of the lighting device. As depicted in FIG. 2, when a toggle switch S24, S25 is closed or short-circuited, a zero voltage appears at the corresponding pin which can be recognized and interpreted by the microcontroller 22 as external control signal to execute a corresponding illumination type. By operating the external control means S24, S25 properly, the microcontroller generates with program codes, either reacting to or disabling the motion sensor 4, a zero or a VDD voltage at the pins P0.0 and P1.0 respectively to control the luminance of the two light source loads 6a, 6b. The luminance intensity of the lighting device 10 is controlled by the electric voltages at the pins P0.0 and P1.0, for instance: With zero voltage at both P0.0 and P1.0 is a darkness state (0); with zero voltage at P0.0 and VDD at P1.0 is a low level illumination (L); with VDD at both P0.0 and P1.0 is a high level or full-power illumination (H).

Referring FIG. 2, incorporating with the external control means S24, S25 and the motion sensor 4, the microcontroller 22 runs subroutines in response to the external control signals for the second stage power-saving illumination, which are:

(1) Complete cutoff (0), for instance, by opening both the switch S24 and S25, wherein the second stage illumination is darkness (0) by disabling the motion sensor 4 throughout the rest of nighttime;

(2) Low level illumination (L), for instance, by opening the switch S24 and by closing the switch S25, wherein the second stage is a low-level illumination and disabling the motion sensor 4 throughout the rest of nighttime;

(3) Single-level illumination coupled with motion sensor (H, 0), for instance, by closing the switch S24 and by opening the switch S25, wherein the illumination is changed from darkness (0) to a high-intensity brightness (H) in response to the motion detection signal;

(4) Two-level illumination coupled with motion sensor (H, L), for instance, by closing both the switch S24 and S25, wherein the illumination is changed from a low (L)- to a high (H)-intensity luminance in response to the motion detection signal.

In view of FIG. 2, the light source loads 6a, 6b can be incandescent lamps, fluorescent lamps, AC LED modules or LED bulbs which are connected via relays 5a, 5b to an AC power. FIG. 2 depicts schematically a lifestyle lighting device 10 which performs two-level illumination based on a double-light source load structure comprising a low-wattage and a high-wattage light source load such that the high-wattage light source load 6a is activated by the motion sensor 4 and the low-wattage light source load 6b is automatically turned on and off by the photo sensor 3. In fact, there is no restriction imposed on the type and the number of the light source loads. The operation principle of a lifestyle lighting device according to FIG. 1 can be equally applied to a single light source load, driven either by DC power or AC power, wherein the lighting device performs a two-level illumination at the second stage by dimming technique which will be described as follows.

Figure 3:
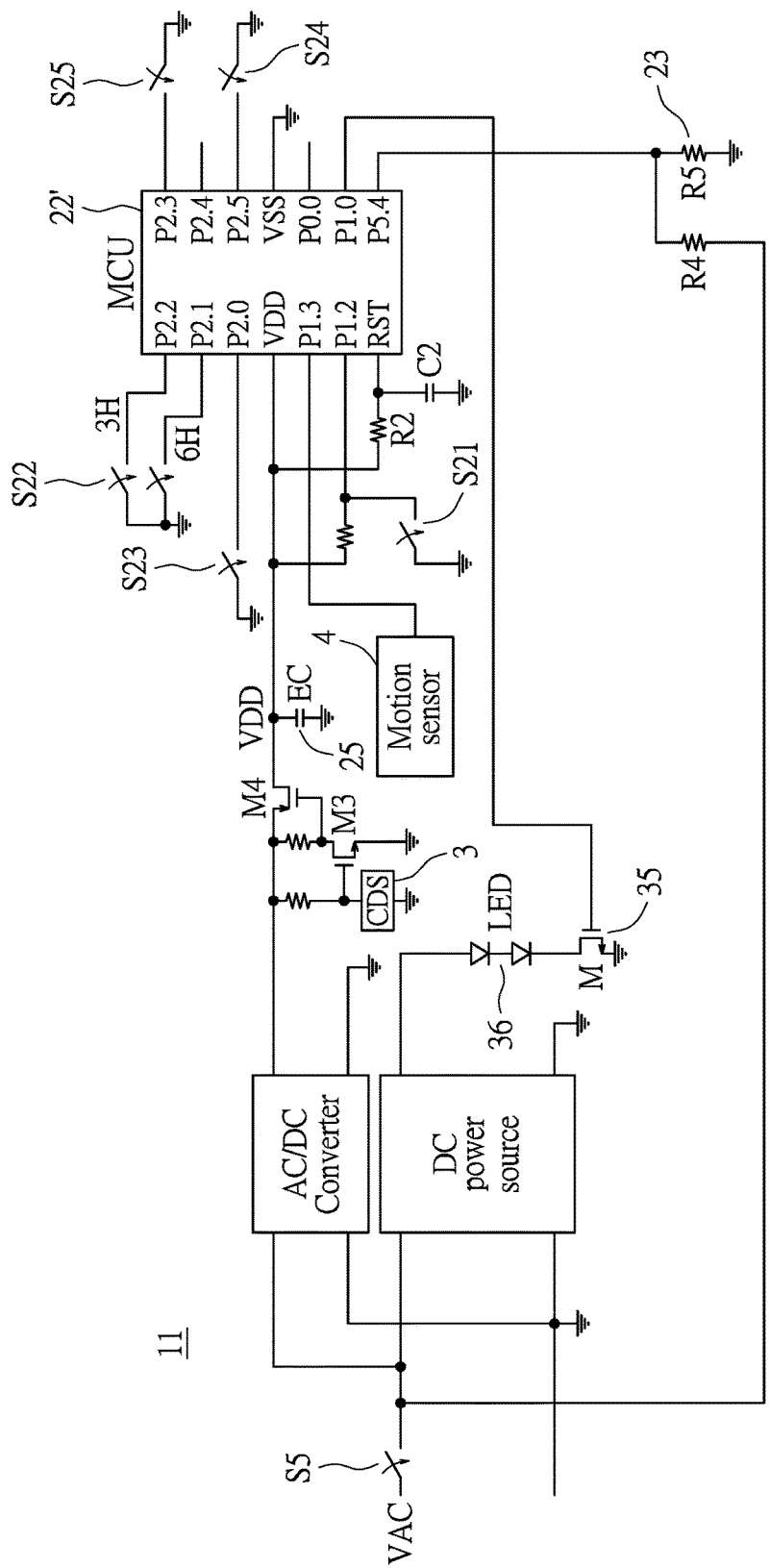
FIG. 3 schematically shows a circuit diagram depicting the lighting device to perform lifestyle lighting by controlling the conduction state of a unidirectional controllable switching unit according to an embodiment of the present invention.

Referring to FIG. 3, according to an embodiment of the present disclosure, the lighting device 11 is equipped with a light-emitting diode (LED) module 36 connected in series with a NMOS transistor M 35 and a DC power source. Comparing with the embodiment of the present disclosure depicted in FIG. 2, the LED module 36 is a single light source load and the transistor M 35 is a unidirectional controllable switching unit. Besides the difference in light source structure and driving power source, the lighting devices 11 adopts the same controller structure including a photo sensor 3 and a motion sensor 4 as shown in FIG. 2. In FIG. 3, the microcontroller 22' runs programs in response to the external control signals or trigger signals generated from the external control means S21-S25, 23, S5 in the same manner as described for the circuit diagram sketched in FIG. 2.

Refer to FIG. 3. By operating the control unit S21 to select the working mode, the lighting device 11 performs dusk-dawn mode and lifestyle mode, respectively, through the luminance control of the LED module 36. In the lifestyle mode the lighting device 11 performs the full-power illumination for a preset time period and is converted into the power-saving illumination at a conversion time point controlled by a delay timer in the microcontroller 22'. By operating the control means S22, S23, S5 properly, the delay timer of the microcontroller 22' is configured by one of the three setting methods, which are the anytime setting, the fixed time point setting and the fixed time period setting, in order to execute the corresponding delay time subroutines. Furthermore, by operating the external control means S24, S25 properly, the lighting device 11 performs the energy-saving or security illumination at the second stage to generate one of four different illumination types which are complete darkness, low-power illumination, motion sensor activated single-level and two-level illumination.

Figure 3A:
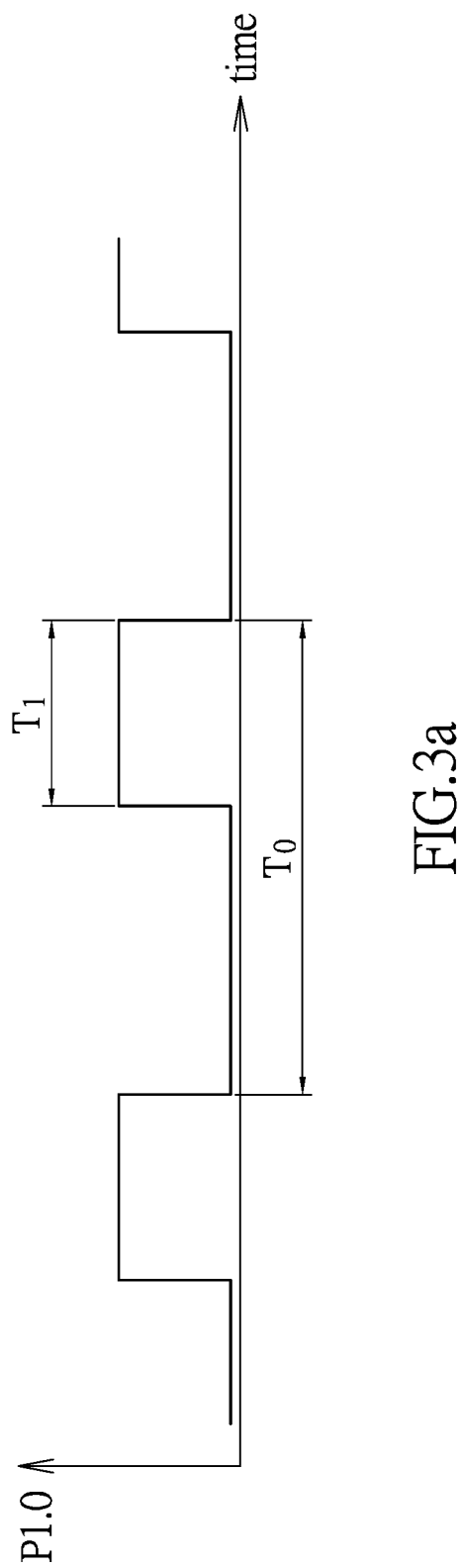
FIG. 3a schematically shows a PWM signal for controlling the conduction state of the unidirectional controllable switching unit in the circuit diagram of FIG. 3.

Referring to FIG. 3, the NMOS transistor M 35 has its drain connected to the LED module 36 and its gate connected with one pin P1.0 of the microcontroller 22'. The microcontroller generates with program codes in response to the external control signals a series of pulse-width-modulation (PWM) signals at the pin P1.0. FIG. 3a represents the waveform of a PWM signal which has a low voltage and a high voltage within the period $T_0$, wherein the high voltage is characterized by a time length $T_1$. The ratio of $T_1$ to $T_0$, namely, $T_1/T_0$, is referred to as the duty cycle of the PWM signal. The PWM signal generated at the pin P1.0 is fed to the control gate of the unidirectional control switch 35, wherein the transistor M 35 is turned on during the time $T_1$ by the high voltage such that the conduction rate of the transistor M 35 is controlled by the PWM signal. The duty cycle of the PWM signal determines an average electric power transmitting to the LED module 36.

Referring to FIG. 3, when the lighting device 11 is in lifestyle mode performing the second stage illumination, the motion sensor activated single-level illumination is performed by the microcontroller 22' with program codes in response to the motion sensor 4, wherein a PWM signal of the maximum duty cycle is generated at the pin P1.0 and sent to the transistor M 35 for controlling a maximum average electric power transmitting to the LED module 36 so as to perform full-power illumination, and then after a short time period a zero voltage is generated at the pin P1.0 to shut down the LED module 36; the motion sensor activated two-level illumination is performed by generating a PWM signal of the maximum duty cycle for the full-power illumination and then a PWM signal of small duty cycle for the low-power illumination.

Figure 4:
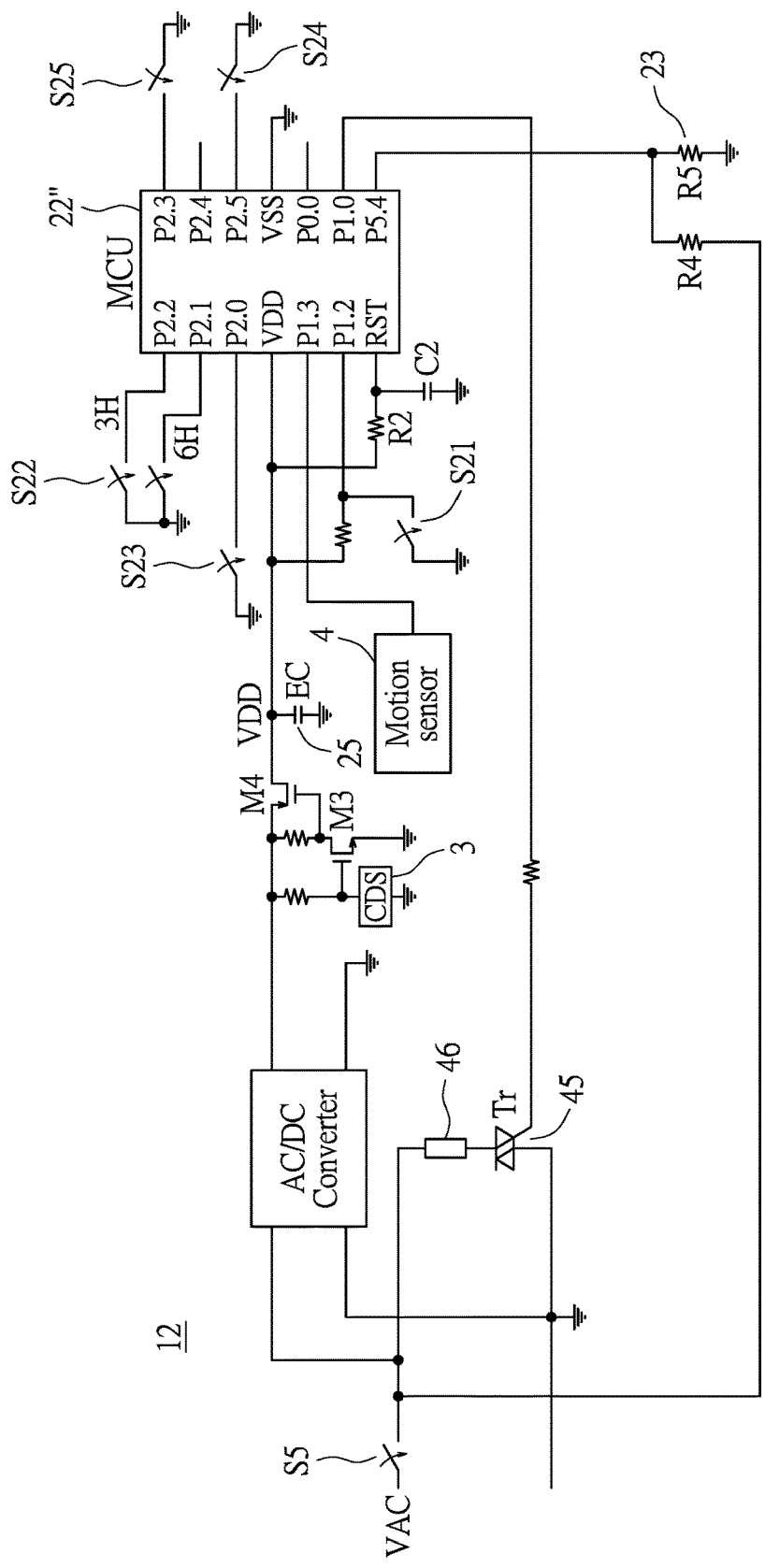
FIG. 4 schematically shows a circuit diagram depicting the lighting device to perform lifestyle lighting by controlling the conduction state of a bidirectional controllable switching unit according to an embodiment of the present invention.
Figure 4A:
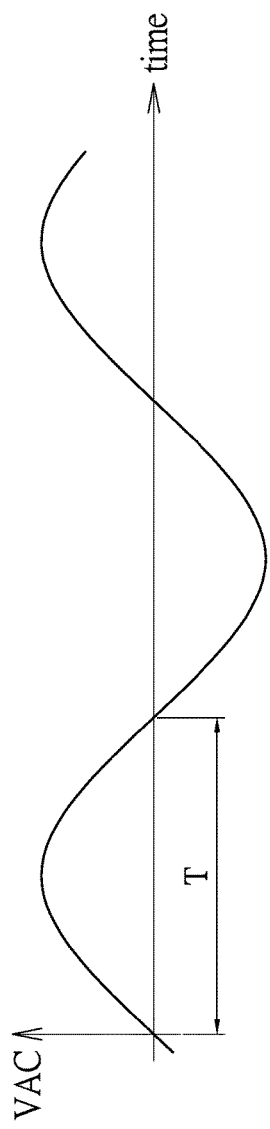
FIG. 4a, FIG. 4b and FIG. 4c schematically show voltage signals for controlling the conduction state of the bidirectional controllable switching unit and the AC electric power transmitting to a light source load in the circuit diagram of FIG. 4.

Refer to FIG. 3 and FIG. 3a. In the lifestyle mode, when the lighting device 11 is activated by the motion sensor to perform single-level or two-level illuminations, the microcontroller 22' can be further controlled by an additional external control signal to enter a subroutine to continuously vary the duty cycle of the PWM signal, for instance by continuously varying the time length $T_1$ of the PWM signal in FIG. 3a, for controlling the controllable switching unit 35 to transmit a continuously varying average electric power to the light source load 36, such that during the varying process the luminance of the lighting device 11 increases slowly in intensity until a full-power illumination, what is referred to as soft on, and, after a short time interval, the luminance of the lighting device 11 decreases slowly in intensity to end the motion sensor activated cycle, what is referred to as soft off Refer to FIG. 4. According to an embodiment of the present disclosure, the lighting device 12 has a light source load 46 connected in series with a triac Tr 45 and an AC power. Comparing with the lighting device 11 as depicted in FIG. 3, the triac Tr 45 is a bidirectional controllable switching unit. The light source load 46 can be a halogen lamp, an incandescent lamp, a fluorescent lamp, an AC LED module or a LED bulb. Besides the difference in the controllable switching unit 45, the lighting device 12 adopts the same controller structure as shown in FIG. 2 and FIG. 3. In FIG. 4, the microcontroller 22" runs programs in response to the external control signals or trigger signals generated from the external control means S21-S25, 23, S5 in the same manner as described for the embodiments depicted in FIG. 2 and FIG. 3, wherein the lighting device 12 performs respectively dusk-dawn mode and lifestyle mode, depending on the external control signal generated from the control means S21.

Referring to FIG. 4, the microcontroller 22" has a pin P1.0 connected to a control gate of the bidirectional controllable switching unit 45 to control its conduction state for transmitting AC electric power to the light source load 46. The voltage divider 23, with its output connected to the pin P5.4 of the microcontroller 22", can serve both as the sampling circuit for the anytime setting and also as a zero-crossing-point detector. The anytime setting is done by operating the power switch S5 to generate a zero voltage for a time duration in second range at the pin P5.4, which is detected by the microcontroller 22 and interpreted as the anytime setting signal. As a zero-crossing-point detector the microcontroller 22" receives constantly at the pin P5.4 a zero-crossing signal in millisecond range synchronized with the AC power.

To elucidate the use of the zero-crossing-point detector and the principle of controlling the bidirectional controllable switching unit, in accompanying FIG. 4, FIG. 4a, FIG. 4b and FIG. 4c represent respectively the waveforms of (a) AC power signal, (b) the phase-angle control signal at the pin P1.0 and (c) the voltage signal across the two terminals of the light source load 46. Referring to the waveforms in FIG. 4a and FIG. 4b, the microcontroller 22" detects with the help of the zero-crossing-point detector 23 constantly at the pin P5.4 a zero-crossing signal, not shown here, in each half period T of the sinusoidal AC power, and generates with its program codes a square wave in FIG. 4b at the pin P1.0 which is synchronized with the AC power in FIG. 4a and serves as phase-angle control signal. The square wave in FIG. 4b has its front edge lagging behind the zero-crossing point of the AC power in FIG. 4a. Referring to the waveforms in FIG. 4b and FIG. 4c, the phase-angle control signal at P1.0 triggers at its front edge the triac 45 into conduction, wherein during the conductive period of the triac 45 a voltage signal of the duration ton appears at the two terminals of the light source load 46 such that an average electric AC power in proportion to the time duration $t_{on}$ is transmitted to the light source load 46.

Referring to FIG. 4, in conjunction with the zero-crossing-point detector 23, the microcontroller 22" generates in response to the external control signals different phase-angle control signals at the pin P1.0 with different time lags behind the zero-crossing point, so as to control different conductive phase angles of the triac Tr 45 to respectively transmit full power, small power and no power to the light source load 46, such that the lighting device 12 performs full-power illumination, low-power illumination and darkness, respectively.

Referring to FIG. 4, FIG. 4a, FIG. 4b and FIG. 4c, when the lighting device 12 performs single-level or two-level motion sensor activated illuminations, the microcontroller 22" can be further controlled by additional external control signal to enter a subroutine of the program codes to slowly change the conductive duration of the controllable switching unit 45. The microcontroller 22" with program codes generates phase-angle control signals in FIG. 4b with its front edge shifting continuously with time to continuously vary the conductive phase angle of the triac Tr 45, such that a continuously varying AC electric power, which results from a continuously varying conductive duration $t_{on}$ of the triac Tr 45, is transmitted to the light source load 46, wherein, during the varying process, the illumination of the lighting device 12 increases slowly in brightness till a full-power level (soft on) and after a short time interval decreases slowly in brightness to end the motion sensor activated cycle (soft off).

Figure 4B:
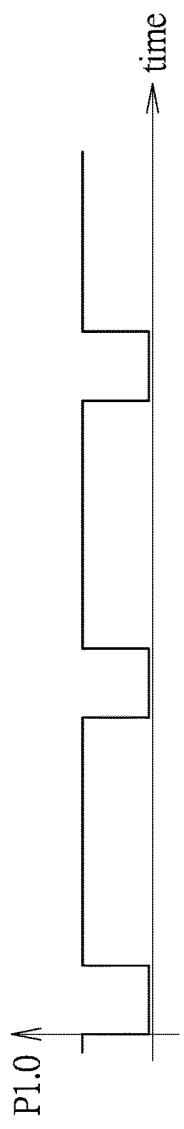
Figure 4C:
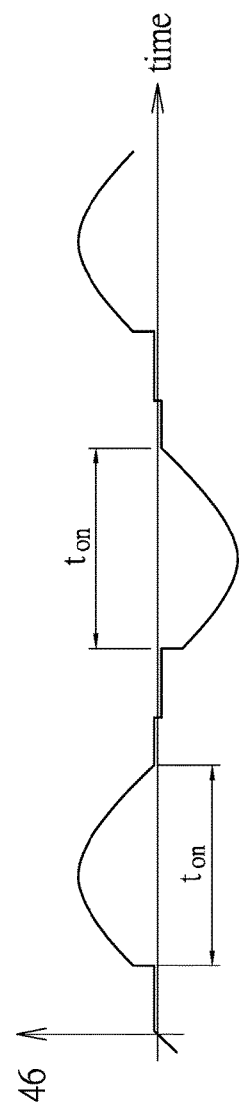

The use of PWM signal and phase-angle control signal, as depicted respectively in FIG. 3a and in FIG. 4b, to vary or to dim the luminance of light source load, offers many variations in controlling luminance level of the lifestyle lighting device, which can be done simply by modifying the program codes of the microcontroller without changing the circuit hardware as disclosed in embodiments depicted in FIGS. 3-4. When the lighting devices performs motion sensor activated two-level illumination, the luminance intensity of the low-power illumination can be further adjusted by using additional external control signal to control the microcontroller to run a corresponding subroutine.

The lighting device according to various embodiments of the present invention relies on the operation of external control means to generate external control signals. To facilitate the operation of the external control means, user-oriented construction of the external control means is required, wherein the external control means can be composed of push button, toggle switch, infrared sensor or similar means which generates constant voltage or binary signal with a low and a high voltage readable by the microcontroller and interpreted as the external control signal to execute a corresponding subprogram in the microcontroller. Furthermore, the binary signal can be a square waveform, for instance, with a small width for low voltage, referred to as short-zero control signal, or with a large width for low voltage, referred to as long-zero control signal. The use of binary signal in form of short-zero and long-zero can facilitate the selection of different working functions designed in the lighting device.

Figure 5:
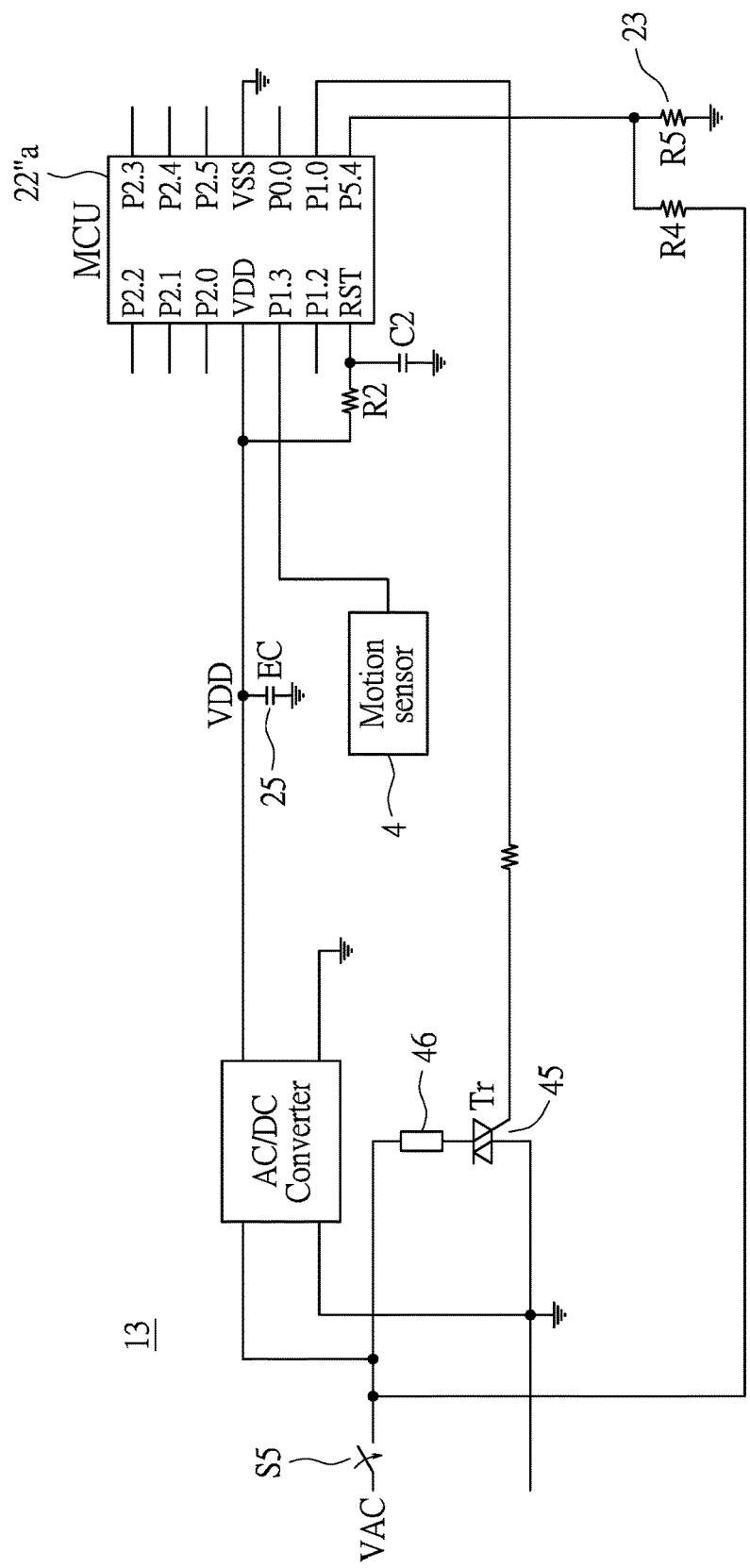
FIG. 5 schematically shows a circuit diagram depicting a variation in construction of a lighting device with lifestyle solution.
Figure 6A:
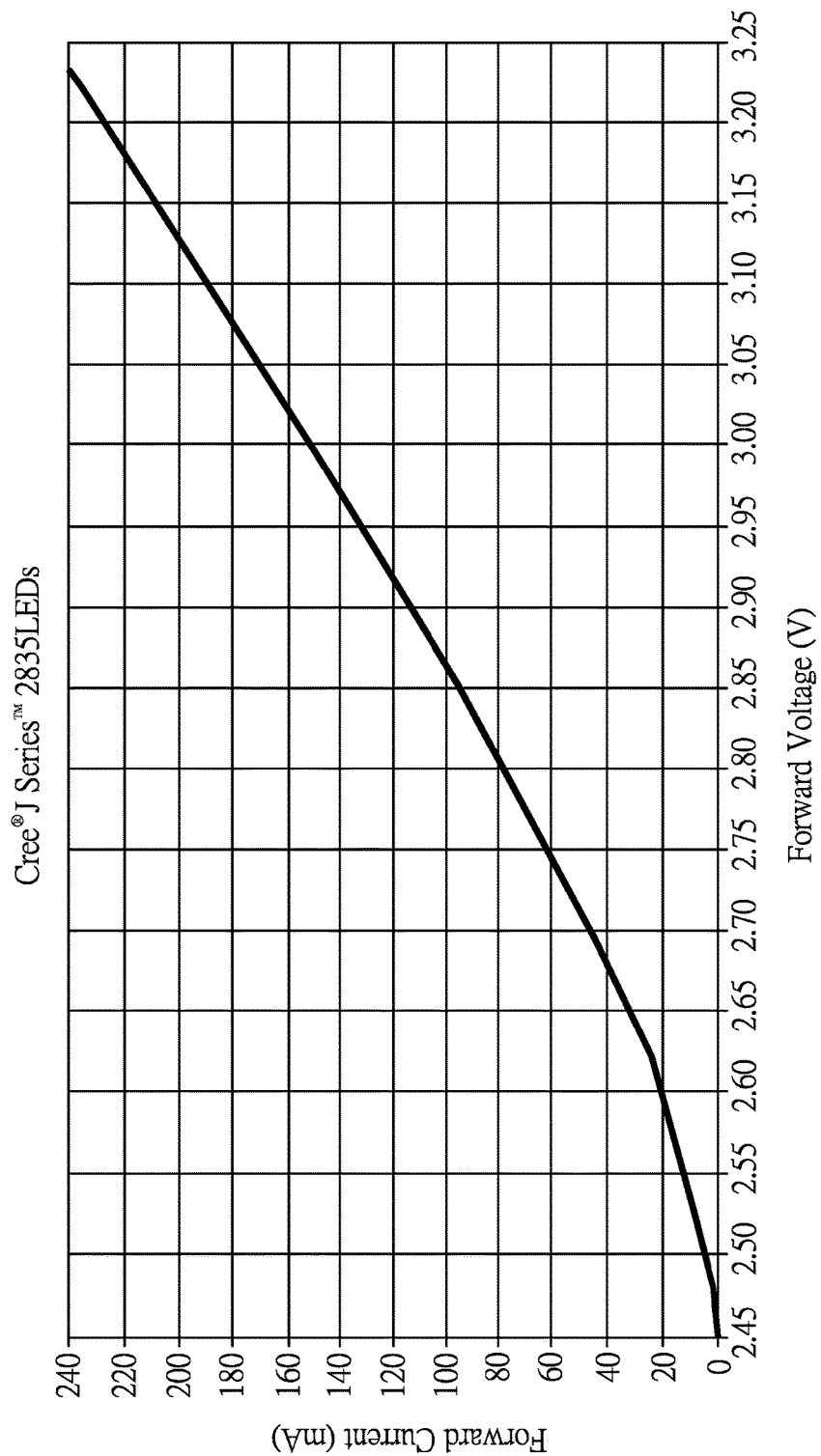
FIG. 6a, FIG. 6b, FIG. 6c and FIG. 6d are supplemental drawings schematically showing a V-I relationship charts (Forward Voltage vs. Forward Current) for a white LED chip.
Figure 6B:
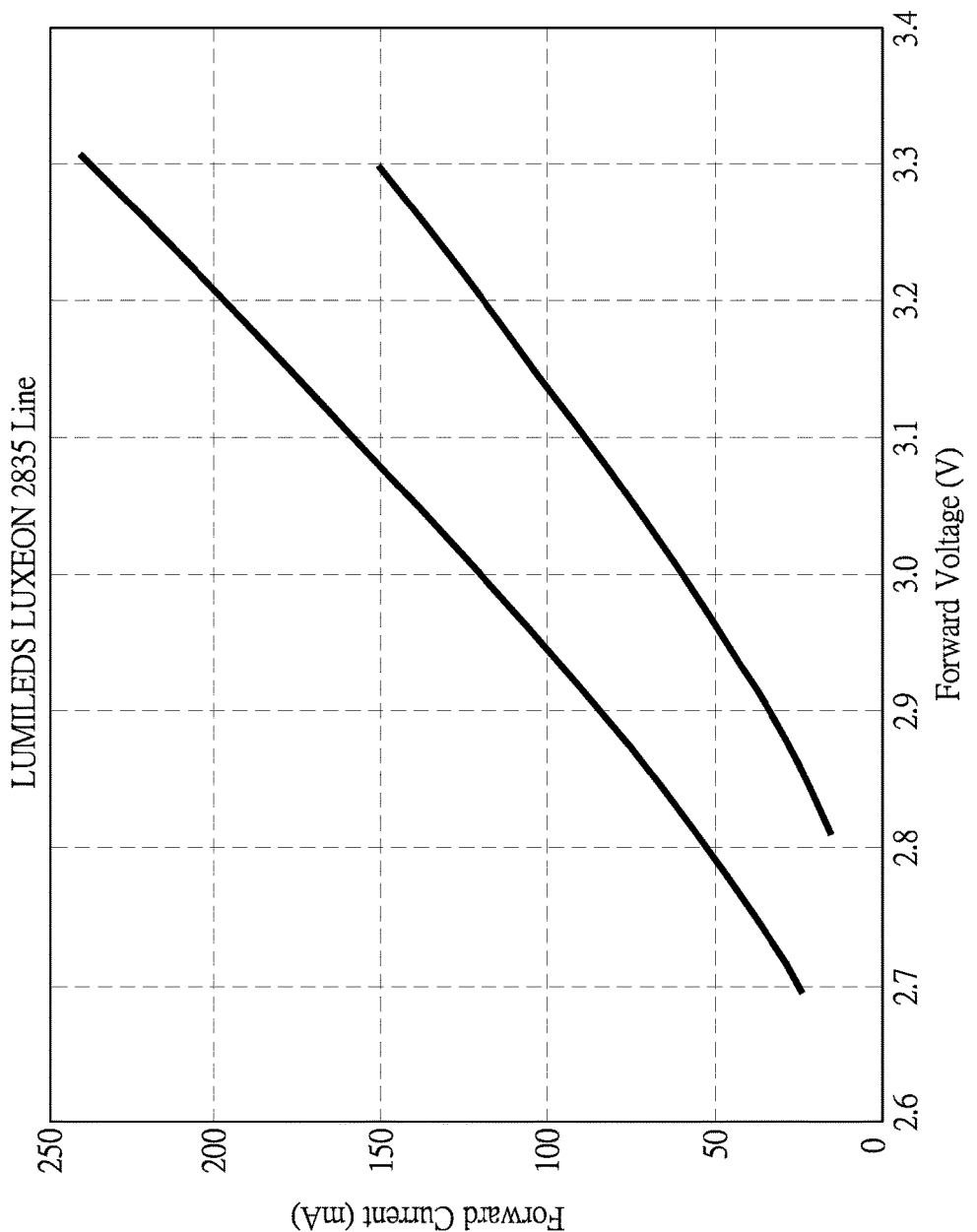
Figure 6C:
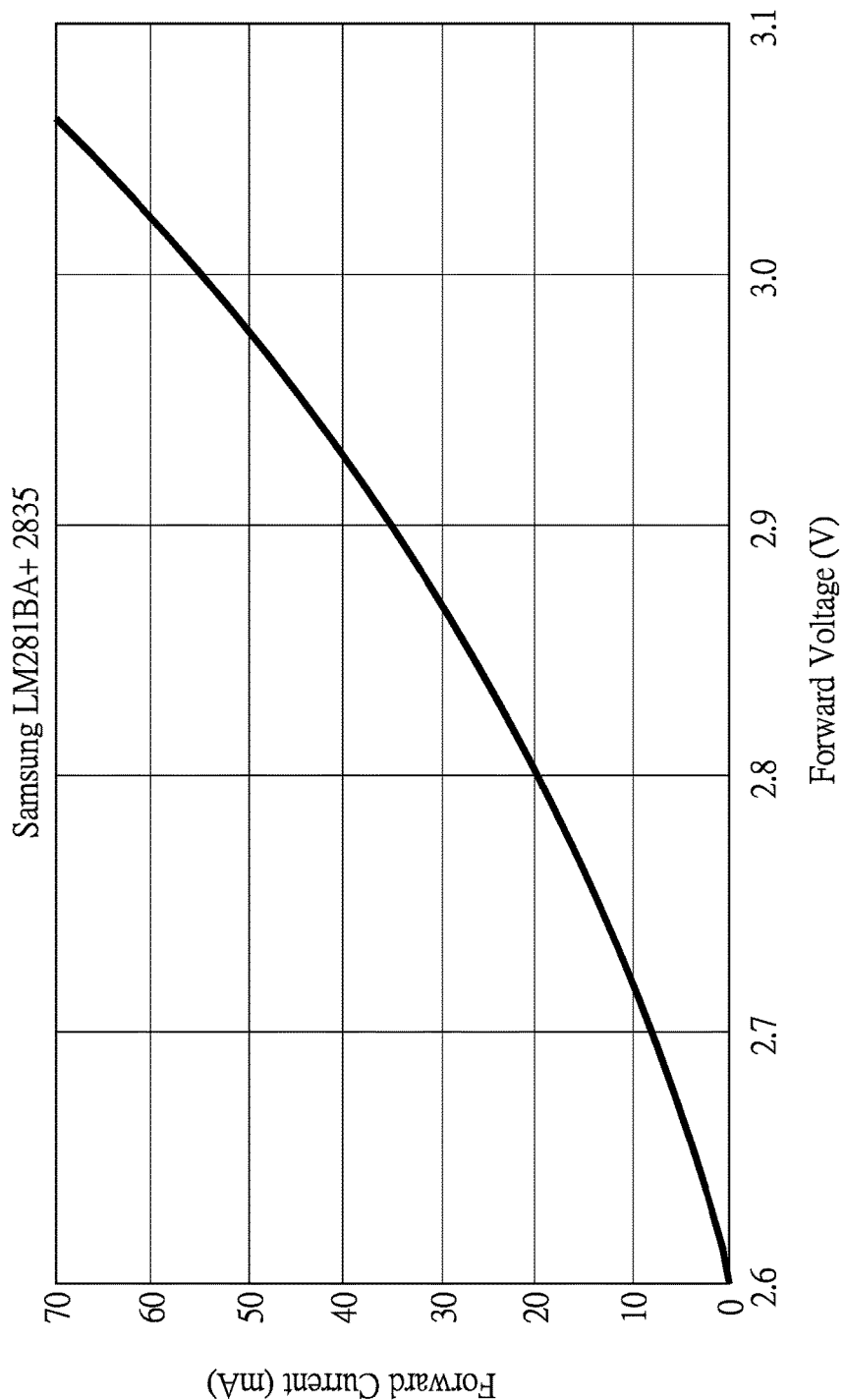
Figure 6D:
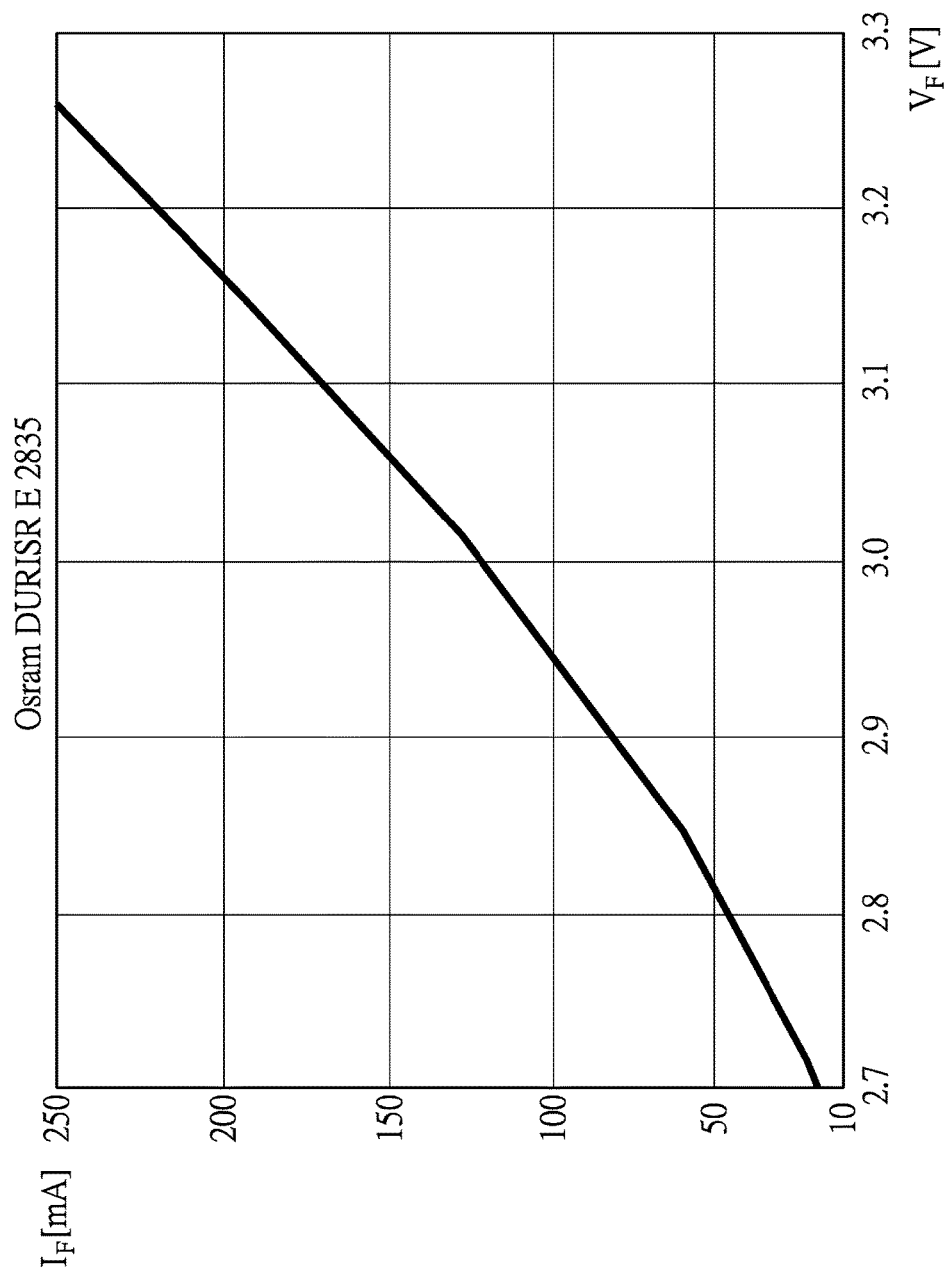

Based on the operation principle depicted in FIG. 1, there are many possibilities to implement lifestyle solution. In accompanying FIG. 4, FIG. 5 shows schematically a circuit diagram that is in fact a variation derived from FIG. 4, wherein the photo sensor CDS 3 and the external control means S21-S25 are removed, with the exception that the main power switch S5 is reserved for some technical applications. In FIG. 5, the luminance of the single light source load 46 is basically controlled by different conductive phase angles of the triac Tr 45 with method as described for the circuit diagram in FIG. 4. Comparing with the circuit of FIG. 4, the circuit depicted in FIG. 5 has some features deserved to be mentioned here. Referring to FIG. 5, the lighting device 13 can be so constructed that it has a microcontroller 22"a with program codes to control its illumination, for instance, to perform a general illumination mode and a lifestyle mode respectively by operating the power switch S5. The general lighting mode is related to a usual on/off operation of the switch S5, such that with the switch S5 being turned on, the lighting device 13 illuminates with full power; while with the switch S5 being turned off, the lighting device 13 shuts off completely. To be distinguishable from the general illumination mode, the lifestyle mode is selected, for instance, by momentary turning off and turning back on the switch S5 within a preset instant time period, such as 1-2 seconds. If the microcontroller 22"a with program codes detects this on-off-on operation sequence through the pin P5.4 connected to the voltage divider 23, the microcontroller 22"a runs a corresponding subroutine for performing the lifestyle mode, wherein the lighting device 13 performs a full-power illumination for a short time period, for instance, a period of five minutes, and then is converted to a single-level or a two-level illumination activated by the motion sensor 4. The simple circuit construction in FIG. 5 eliminates timer settings and various functional selections.

The lighting device 13, as depicted in FIG. 5, can be used for general illumination in house. It is even more favorable to design the lifestyle mode by combining the aforementioned soft on and soft off techniques to the single-level or two-level illumination activated by motion sensor. With such a lighting device 13, the house owner before sleeping can simply operate the wall switch S5 by on-off-on actions to select the lifestyle mode; the lighting device 13 illuminates with full power for a short time period and then enters a standby power-saving status to await the detection signal from the motion sensor 4. If the house owner wakes up sometimes in the middle of the night, the soft on illumination activated by the motion sensor 4, wherein, instead of a sudden glaring brightness, the luminance intensity of the lighting device increases gradually, can make him feeling comfortable as he moves through a dark space. The lighting device is automatically turned off softly or switched gradually to a low level illumination after the house owner goes back to sleep. The circuit sketched in FIG. 5 provides therefore a simple and practical lifestyle solution without the use of photo sensor.

To make the lighting device of the present invention even more user friendly, additional lifestyle solution is provided for different time or on different occasions. A preferable solution is for example to build a multi-mode lighting device to perform two or three working modes merging into one single lighting device based on microcontroller technology, wherein the user can select one of the multi-modes for performance by using an external control signal to alternately change the working mode or using external control signals of different binary patterns to activate corresponding working modes. The multi-modes always includes a basic general illumination mode (with or without photo sensor) coupled with the above mentioned lifestyle security modes for user's selection.

To extend the lifestyle solutions based on the circuit diagram depicted in FIG. 5, in which the lighting device 13 consists of a motion sensor 4, a microcontroller 22"a and a plurality of external control means not shown in FIG. 5, the program codes of the microcontroller 22"a can be further modified to realize the automatic on/off function of the photo sensor such that the lighting device 13 is automatically turned on at dusk and turned off at dawn by the program codes of the microcontroller 22"a, wherein during the course of nighttime the lighting device 13 has at least two working modes selectable by the users. In order to perform the aforementioned lifestyle mode without using photo sensor, an initial setting process is taken by the users to input at least three time parameters, namely a first preset time point to turn on the lighting device for a full-power illumination, a second preset time point to convert to a power-saving/security illumination which is activated by the motion sensor and a third preset time point to turn off the lighting device and at the same time to reset the microcontroller for the next 24-hour performance cycle. The users based on their living habits operate corresponding external control means to generate at least three triggering signals to the microcontroller respectively at three time points representing the time to turn on for a full-power illumination, the time to convert to a power-saving illumination and the time to turn off the lighting device. Upon receiving the three triggering signals generated by the users, the microcontroller with program codes is able to store the time point information and thereby establish the working procedures to perform the lifestyle illumination mode on a 24-hour repetitive basis until new triggering signals are given by the user to change the time point parameters to establish a new lifestyle illumination mode. Such lifestyle mode without reliance on a photo sensor enables the users to manage their time table of lighting performance for both indoor and outdoor applications in a more flexible, more friendly and more energy saving ways.

The automatic on/off lighting device control based on the program codes of the microcontroller also helps to improve home security from the perspective of antitheft consideration. When the home owners are away for business trip or vacation for a longer period of time, say a week, if the houses are always dark or lit during the night time, for instance, the lighting device is automatically turned on and turned off by a photo sensor, it gives the intruder or thief a strong signal that the owners are out for a long trip and it is a good time to break in. On the contrary, the use of microcontroller to replace photo sensor for lighting control offers great flexibility to program a dynamically timed illumination, for instance, by adding an instant drop of illumination followed by a shorter time period of full-power illumination, say 1 to 10 minutes, till the second preset time point of conversion at which the lighting device being switched to a power-saving illumination. The temporary drop of illumination for a couple seconds serves as remind signal telling the users it is time to rest and the short extension of full illumination simply gives the user ample time to wrap up for sleeping. If the user wants to manage the third preset time point precisely according to his or her living need, the above initial setting process for inputting three preset time points is needed. However from a practical consideration and given the fact that human being living habit is used to 6-8 hours sleep it may just be good enough to build into the program codes with an eight hours time delay to perform the energy saving/security mode on an automatic basis. Thus, after 8 hours from the second preset time point for conversion of power-saving illumination, or alternatively 12 hours from the power on time point, the microcontroller with program codes will turn off the light and reset for the next operating cycle.

Although there is no restriction on the types of light sources which can be used for performing the technologies of the present invention, in other words incandescent bulbs, fluorescent bulbs, halogen bulbs or LED bulbs all have been usable for performing various functions of the present invention, it is to be noted that in the past two years the prices of LEDs have continuously and substantially reduced and have passed a sweet spot to trigger a humongous demand for using LED bulbs to replace incandescent bulbs to be the main light source for general illumination. A 6-watt LED bulb being equivalent to 60-watt incandescent bulb is now retailed at only $1 which is very affordable and attractive to the consumers considering its energy saving advantage consuming only 10% of electric power required for operating an incandescent bulb with the same lumens output and its durability advantage lasting up to 8 times of operating life for an incandescent bulb (LED can last up to 20,000 hours while an incandescent bulb may only last about 3000 hours), with such big advantages over incandescent light sources the LED bulbs now a day are dominating the light source market worldwide while the conventional light sources such as incandescent bulbs and fluorescent bulbs are becoming obsolete lighting technologies. With such a revolutionary change in the light emitting technology it is necessary to focus the applicable light source of the present invention to the use of only the LED bulbs and to more precisely define a much narrower domain of claim limitations such that malfunctions of LED bulbs will not occur to affect the performance of the technologies of the present invention. This focusing and confining process to narrow down the claim scope is only an effort to further confine the range of the working voltage for the LED load to a much narrower domain such that the LED load can be successfully turned on and an occurrence of thermal runaway to damage the semiconductor structure of the LED load can be avoided. The electrical characteristics of LED are totally different from the conventional light sources such as incandescent bulbs and fluorescent bulbs. Such electrical characteristics need to be added to the technical description of the present invention as a necessary and important part of required technologies for successfully performing the present invention. In fact, any LED lighting design failing to comply with constraints of such electrical characteristics is bound to become a useless art.

The LED bulbs or LED loads are new-generation light sources configured with a plurality of light emitting diodes (LEDs). The light emitting diode is made with a P-N junction semiconductor structure featured with three unique electrical characteristics which make LED bulbs completely different from the conventional light sources such as incandescent bulbs or fluorescent bulbs, the first electrical characteristic is one-way electric conduction through the P-N junction of the LED, the second electrical characteristic is a threshold voltage $V_{th}$ required to trigger each LED to start emitting light and the third electrical characteristic is a maximum working voltage $V_{max}$ allowed to impose on each LED to avoid a thermal runaway to damage or burn out semiconductor LED structure. An LED chip is a small piece of semiconductor material with at least one LED device manufactured inside the semiconductor material, which is a fundamental element for composing an LED load. Such LED chip is required to operate in a voltage domain ranging from at least 2.5 volts to at most 3.5 volts for a white or blue light LED chip; the 2.5 volts is the threshold voltage $V_{th}$ and the 3.5 volts is the maximum working voltage $V_{max}$. A plurality of such LED chips or sets of such LED chips may be electrically connected in series to configure one LED bulb or one LED load with a higher wattage driven by a higher voltage. Such one LED load so configured is required to operate with a working voltage V ranging from N×2.5 volts to N×3.5 volts, or N×2.5 volts≤V<N×3.5 volts, wherein N, with N=1, 2, 3 . . . , is the number of the LED chips being electrically connected in series for forming such one LED load, wherein a plurality of serial-connected LED chips may be further connected in parallel or a plurality of parallel-connected LED chips may be further connected in serial for configuring a high power LED load. For example, if N is 3 meaning that 3 pieces of the LED chips or three sets of parallel-connected such LED chips are electrically connected in series to form such one LED load, the working voltage V of such one LED load comprising a plurality of LED chips is then required to operate between a minimum voltage of 7.5 volts in order to successfully trigger such one LED load to emit light and a maximum working voltage of 10.5 volts allowed to impose on such LED load to avoid a thermal runaway to damage or burn out a semiconductor LED structure. For an LED load configured with a plurality of the LED chips in any LED lighting device, regardless such LED load being configured with AC LED chips or DC LED chips, the working voltage of each LED load is required to operate in a domain established by the minimum voltage N×2.5 volts and the maximum working voltage N×3.5 volts, wherein N is the number of the LED chips electrically connected in series. For any LED lighting device comprising an LED load it is required that the LED load in conjunction with a power source is configured with a combination of in series and in parallel connections such that the electric current passing through each LED chip of the LED load remains at an adequate level such that a voltage V across each LED chip of the LED load complies with an operating constraint of $V_{th}<V<V_{max}$ featuring electrical characteristics of the LED chip, wherein $V_{th}$ is a threshold voltage required to trigger each LED chip to start emitting light and $V_{max}$ is a maximum operating voltage of each LED chip of the light emitting unit. Such narrow operating range therefore posts an engineering challenge for a circuit designer to successfully design a reliable circuitry configured with an adequate combination of in series connection and in parallel connection for operating a higher power LED security light.

FIGS. 6a-6d are supplemental drawings schematically showing a V-I relationship charts (Forward Voltage vs. Forward Current) for a white LED chip; as can be seen from the chart when a forward voltage V is below a minimum forward voltage at around 2.5 volts, the LED chip is not conducted so the current I is zero, as the forward voltage exceeds 2.5 volts the LED chip is activated to generate a current flow to emit light, as the forward voltage continues to increase, the current I increases exponentially at a much faster pace, at a maximum forward voltage around 3.5 volts the current I becomes 250 mA which generates a heat that could start damaging the PN junction of the LED chip. The minimum forward voltage (the threshold voltage or cut in voltage) and the maximum forward voltage are readily available in the specification sheets at each of LED manufacturers, such as Cree, Lumileds, Samsung, Osram and etc. Different LED manufacturers may have slightly different figures due to manufacturing process but the deviations of differences are negligible. They are necessary conditions for configuring any LED lighting products.

FIG. 7 is a data sheet showing the minimum forward voltages and maximum forward voltages collected from various LED manufacturers. They are fundamental requirements for configuring any LED lighting control devices.

In summary, the above added matters contain the following inherent facts:

1) The operating constraint of $V_{th}<V<V_{max}$ featuring electrical characteristics of the LED is inherent in the physical properties of a P-N junction semiconductor structure.
2) The modified claim limitations represent smaller but more solid claim structure by including the compliance of the operating constraint as an important part of the required technologies for performing the present invention such that a malfunction of an LED load can be avoided.

The descriptions illustrated supra set forth simply the preferred embodiments of the present invention; however, the characteristics of the present invention are by no means restricted thereto. All changes, alternations, or modifications conveniently considered by those skilled in the art are deemed to be encompassed within the scope of the present invention delineated by the following claims.

What is claimed is:

1. A lifestyle security light, comprising:
 a light emitting unit, configured with a plurality of light emitting diodes;
 a controller, electrically coupled with a switching circuitry for controlling an electric power transmitted from a power source to the light emitting unit;
 a photo sensor electrically coupled with the controller, for switching on the light emitting unit at dusk and switching off the light emitting unit at dawn;
 a motion sensor electrically coupled with the controller, for detecting a motion intrusion;
 a first external control device electrically coupled with the controller, for generating at least one first external control signal; and
 a time setting algorithm, in conjunction with the first external control device for determining a preset time point to switch the light emitting unit from performing a first illumination mode to performing a second illumination mode;
 wherein the switching circuitry is electrically connected between the power source and the light emitting unit, wherein the switching circuitry comprises at least one semiconductor switching device for controlling transmission of different electric powers delivered to the light emitting unit, wherein the controller outputs at least one control signal to control at least a conduction rate of the at least one semiconductor switching device to generate different illuminations for performing at least the first illumination mode and the second illumination mode to characterize a lifestyle lighting solution;

wherein the first illumination mode is a general illumination mode with the motion sensor being temporarily deactivated and the second illumination mode is a motion sensing illumination mode with the motion sensor being activated;

wherein when the controller receives the at least one first external control signal generated by the first external control device, the controller operates the time setting algorithm to set the preset time point determined by a time length of a delay time $t_D$ selected by the first external control device and controlled by the controller to convert the light emitting unit from performing the first illumination mode to performing the second illumination mode;

wherein at dusk the light emitting unit is switched on by the photo sensor to perform the first illumination mode with a first level illumination, the first illumination mode with the first level illumination continues for the delay time $t_D$ until the light emitting unit is switched to perform the second illumination mode with a second level illumination at the preset time point determined by a user, wherein the second level illumination is designed with a turned off state with a zero light intensity or a low level state with a reduced light intensity, wherein during the second illumination mode whenever a motion is detected by the motion sensor, the controller immediately and responsively manages to increase the electric power transmitted to the light emitting unit to perform a third illumination mode with a third level illumination for a predetermined time duration before resuming back to the turned off state or the low level state in the absence of any succeeding motion intrusion, wherein at dawn the light emitting unit is switched off by the photo sensor to end the second illumination mode;

wherein the plurality of light emitting diodes of the light emitting unit and the power source are configured to have a combination of in parallel and/or in series connections such that an electric current passing through each LED of the light emitting unit remains at an adequate level and thus a voltage V across each LED of the light emitting unit complies with an operating constraint of $V_{th}<V<V_{max}$ featuring electrical characteristics of the LED, wherein $V_{th}$ is a threshold voltage required to trigger the LED to start emitting light and $V_{max}$ is a maximum operating voltage across the LED to avoid a thermal damage or burning out a semiconductor structure of the LED construction.

2. The lifestyle security light according to claim 1, wherein the time setting algorithm is designed in the controller.

3. The lifestyle security light according to claim 1, wherein the plurality of light emitting diodes are further divided into two LED loads with different light color temperatures electrically connected in parallel, wherein a first LED load emits a light with a low light color temperature and a second LED load emits the light with a high light color temperature, wherein the first LED load is electrically coupled with a first semiconductor switching device and the second LED load is electrically coupled with a second semiconductor switching device, wherein the first LED load and the second LED load are covered by a light diffuser, wherein the controller outputs a first control signal to control a first conduction rate of the first semiconductor switching device and a second control signal to control a second conduction rate of the second semiconductor switching device to generate the first level illumination characterized a first light intensity and a first light color temperature thru the light diffuser, wherein the first light intensity is determined by a total of the electric powers delivered to the first LED load and the second LED load, wherein the first light color temperature is determined by the composition ratio between the first conduction rate and the second conduction rate in a selected combination of the first conduction rate and the second conduction rate when the total electric power delivered to the light emitting unit is remained unchanged.

4. The lifestyle security light according to claim 3, wherein the first light color temperature of the first level illumination is further adjustable by operating at least one second external control device electrically coupled with the controller, wherein the at least one second external control device is configured with a plurality of light color temperature selection switches enabling the user to select the first light color temperature for performing the first illumination mode, wherein when a light color temperature selection switch is selected, a relevant second external control signal is generated to the controller for setting a light color temperature selected, wherein the controller is designed to operate a light color temperature switching scheme comprising a plurality of light color temperature performances, wherein each of the plurality of light color temperature performances is respectively activated by the relevant second external control signal, wherein each of the plurality of light color temperature performances is further operated with a paired combination of the first conduction rate and the second conduction rate respectively for controlling the first semiconductor switching device and the second semiconductor switching device, wherein for performing each of the plurality of light color temperature performances the first control signal and the second control signal are designed to operate with an arrangement that the first conduction rate and the second conduction rate are reversely and complementarily adjusted such that the first light intensity of the light emitting unit is maintained at a constant level while a mingled light is accordingly adjusted according to the light color temperature selected.

5. The lifestyle security light according to claim 1, wherein the time setting algorithm is an anytime setting process; wherein the user may select a current clock time point or a preprogrammed forward clock time point to be the preset time point, wherein when the controller receives the at least one first control signal from the first external control device, the controller operates to activate the anytime point setting process to establish the preset time point in the memory of the controller for executing a 24-hour cycle time counting process to manage the light emitting unit to automatically convert from performing the first illumination mode to performing the second illumination mode on a daily repetitive basis at each 24-hour cycle time point counting from a former preset time point.

6. The lifestyle security light according to claim 5, wherein the preprogrammed forward clock time point for setting the preset time point is implemented by a programmable switch incorporated with the first external control device, wherein the programmable switch allows the user to select a delay time $t_D$ or a forward clock time point to be the preset time point for activating the 24-hour cycle time counting process.

7. The lifestyle security light according to claim 6, wherein the preset time point is the forward clock time point;

wherein the user may decide a desired clock time point to be the preset time point and select a corresponding time length to set the delay time $t_D$ with the programmable timer, wherein the time length of the delay time $t_D$ is the difference between the desired clock time point and the current clock time point.

8. The lifestyle security light according to claim 5, wherein the at least one first external control signal for setting the preset time point is a short power interruption signal; wherein a power interruption detection circuit is electrically coupled with the controller and the power source for detecting the short power interruption signal.

9. The lifestyle security light according to claim 8, wherein the short power interruption signal received by the controller is generated by turning off and turning back on a power switch electrically coupled to the controller within a predetermined short time duration, wherein the power switch is used as the first external control device and the short power interruption signal is the at least one first external control signal.

10. The lifestyle security light according to claim 5, wherein the at least one first external control signal received by the controller is generated by pushing a push button or pressing a touch pad configured in the external control unit electrically connected to the controller for a short time duration.

11. The lifestyle security light according to claim 1, wherein the time setting algorithm is a fixed time point setting process, wherein the time setting algorithm is configured with a process to automatically adjust and set a time duration of the first illumination mode according to a data base of seasonal time shift detected over a number of days predetermined on a moving average basis such that the light emitting unit is converted from performing the first illumination mode to performing the second illumination mode at the fixed time point.

12. The lifestyle security light according to claim 1, wherein the time setting algorithm is a fixed time period setting method, wherein the first external control device is configured with a plurality of selection switches for selecting the time length of the delay time $t_D$, wherein when a relevant switch is selected, a relevant first external control signal is generated to activate a relevant time setting process for setting the time length of the delay time $t_D$ selected, wherein the controller operates to continue the performance of the first illumination mode for a time period of the delay time $t_D$, wherein the preset time point is the time when the delay time $t_D$ matures and the light emitting unit is accordingly converted from performing the first illumination mode to performing the second illumination upon a maturity of the delay time $t_D$, wherein the time length of the fixed time period is counted from a time point when the photo sensor activates the light emitting unit to start performing the first illumination mode till the preset time point the light emitting unit is converted to performing the second illumination mode.

13. The lifestyle security light according to claim 1, wherein the time setting algorithm is a fixed time period setting method, wherein the first external control device is configured with a plurality of selection switches for selecting the time length of the delay time $t_D$, wherein when a relevant switch is selected, a relevant first external control signal is generated to activate a relevant time setting process for setting the time length of the delay time $t_D$, wherein the controller operates to continue the performance of the first illumination mode for a time period of the delay time $t_D$, wherein the preset time point is the time when the delay time $t_D$ matures and the light emitting unit is accordingly converted from performing the first illumination mode to performing the second illumination upon a maturity of the delay time $t_D$, wherein the time length of the fixed time period is counted from a reference clock time point when the user operates to generate a second external control signal to activate a 24-hour cycle time counting process designed in the controller, such that the time setting algorithm so configured is also a fixed clock time timer, wherein the light emitting unit is converted from performing the first illumination mode to performing the second illumination mode at a fixed clock time being equal to the reference clock time plus the time length of the delay time $t_D$.

14. The lifestyle security light according to claim 1, wherein the time length of the predetermined time duration for performing the third level illumination is adjustable according to the user's lifestyle.

15. The lifestyle security light according to claim 1, wherein a light intensity of the first level illumination is further adjustable by operating at least one second external control device electrically coupled with the controller, wherein the at least one second external control device responsively outputs at least one second external control signal to the controller, wherein the controller accordingly outputs at least one second control signal to control at least a conduction rate of the at least one semiconductor switching device for adjusting the electric power delivered to the light emitting unit.

16. The lifestyle security light according to claim 1, wherein a light intensity of the second level illumination is further adjustable by operating at least one second external control device electrically coupled with the controller, wherein the at least one second external control device responsively outputs at least one second external control signal to the controller, wherein the controller accordingly outputs at least one second control signal to control at least a conduction rate of the at least one semiconductor switching device for adjusting the electric power delivered to the light emitting unit.

17. The lifestyle security light according to claim 1, wherein a light intensity of the third level illumination is further adjustable by operating at least one second external control device electrically coupled with the controller, wherein the at least one second external control device responsively outputs at least one second external control signal to the controller, wherein the controller accordingly outputs at least one second control signal to control at least a conduction rate of the at least one semiconductor switching device for adjusting the electric power delivered to the light emitting unit.

18. The lifestyle security light according to claim 1, wherein the time setting algorithm is implemented by a clock timer designed with clock time setting processes, wherein the clock timer is installed to provide a current clock time information to the controller;

wherein the first external control device is configured with a plurality of selection switches for respectively selecting and activating different clock time setting processes, wherein when a relevant switch is selected for selecting a preset clock time point to be the preset time point, a relevant first external control signal is generated to the controller to activate a relevant clock time setting process for performing the lifestyle lighting solution, wherein the light emitting unit is converted from performing the first illumination mode to performing the second illumination mode at the preset clock time point.

19. The lifestyle security light according to claim 18, wherein the current clock time information is either received from a clock electrically coupled with the controller or received from an external device configured with a clock time counting capacity thru a wireless signal receiver electrically coupled with the controller.

20. The lifestyle security light according to claim 18, wherein a second external control device configured with a time setting unit is further installed, wherein the time setting unit enables the user to convert a time counter of the controller into the clock timer by inputting a current clock time information to the time setting unit and simultaneously operates to generate an external control signal to activate a 24-hour cycle time counting process designed in the controller using the inputted current clock time as a starting point to continue the clock time counting.

21. The lifestyle security light according to claim 20, wherein the external control signal to activate the 24-hour cycle time counting process is an instant power interruption signal by turning off a power switch and turning back the power switch back to on within a predetermined short time interval.

22. A lifestyle lighting device, comprising:
a light emitting unit, comprising a first LED load for emitting light with a low light color temperature and a second LED load for emitting light with a high light color temperature electrically connected in parallel;
a light diffuser, covering the light emitting unit to diffuse lights generated by the light emitting unit;
a loading and power control unit, configured with a controller electrically coupled with a switching circuitry electrically connected between a power source and the light emitting unit for controlling and transmitting electric power to the light emitting unit;
a photo sensor electrically coupled with the controller, for switching on the light emitting unit at dusk and switching off the light emitting unit at dawn;
a motion sensor electrically coupled with the controller, for detecting a motion intrusion;
a first external control device electrically coupled with the controller, for generating at least one first external control signal; and
a time setting algorithm, in conjunction with the first external control device for setting a preset time point employed to switch the light emitting unit from performing a first illumination mode to performing a second illumination mode;
wherein the switching circuitry comprises a first semiconductor switching device electrically connected to the first LED load and a second semiconductor switching device electrically connected to the second LED load, wherein the controller outputs a first control signal to control a first conduction rate of the first semiconductor switching device for delivering a first electric power to the first LED load and outputs a second control signal to control a second conduction rate of the second semiconductor switching device for delivering a second electric power to the second LED load to generate different illuminations thru the light diffuser producing different mingled lights respectively with different light color temperatures for performing at least the first illumination mode and the second illumination mode to characterize a lifestyle lighting solution;
wherein the first illumination mode is a general illumination mode with the motion sensor being temporarily deactivated and the second illumination mode is a motion sensing illumination mode with the motion sensor being activated;
wherein when the controller receives the at least one first external control signal generated by the first external control device, the controller operates the time setting algorithm to set the preset time point determined by a time length of a delay time $t_D$ selected by the first external control device and controlled by the controller to convert the light emitting unit from performing the first illumination mode to performing the second illumination mode, wherein the preset time point is the time point when the time length of the delay time $t_D$ expires;
wherein at dusk the light emitting unit is switched on by the photo sensor to perform the first illumination mode with a first level illumination characterized with a first light intensity and a first light color temperature, wherein the controller manages to output the first control signal and the second control signal to respectively control the first conduction rate of the first semiconductor switching device and the second conduction rate of the second semiconductor switching device to jointly deliver a total electric power to the light emitting unit; the first illumination mode with the first level illumination continues for the delay time $t_D$ until the light emitting unit is switched to perform the second illumination mode at the preset time point selected by a user, wherein when the second illumination mode is started, the light emitting unit is in a turned off state with the motion sensor being activated, wherein during the second illumination mode when a motion intrusion is detected by the motion sensor, the controller manages to output the second control signal to conduct the second semiconductor switching device to deliver the second electric power to the second LED load to enable the lighting emitting unit to generate a second level illumination characterized with a second light intensity and a second light color temperature thru the light diffuser for a short predetermined time duration before resuming back to the turned off state, wherein the second light intensity of the second level illumination is equal to or higher than the first light intensity of the first level illumination in the first illumination mode, wherein at dawn the light emitting unit is switched off by the photo sensor to end the second illumination mode;
wherein the plurality of light emitting diodes and the power source are configured to have a combination of in parallel and/or in series connections such that an electric current passing through each LED of the light emitting unit remains at an adequate level and thus a voltage V across each LED of the first light emitting unit complies with an operating constraint of $V_{th} < V < V_{max}$ featuring electrical characteristics of the LED, wherein $V_{th}$ is a threshold voltage required to trigger the LED to start emitting light and $V_{max}$ is a maximum operating voltage across the LED to avoid a thermal damage or burning out a semiconductor structure of the LED construction.

23. The lifestyle lighting device according to claim 22, wherein the first light color temperature is equal to the second light color temperature.

24. The lifestyle lighting device according to claim 22, wherein the first light color temperature is lower than the second light color temperature.

25. The lifestyle lighting device according to claim 22, wherein the first light color temperature is a low light color temperature and the second light color temperature is a high light color temperature.

26. The lifestyle lighting device according to claim 22, wherein the time setting algorithm is designed in the controller.

27. The lifestyle lighting device according to claim 22, wherein the time setting algorithm is an anytime setting process; wherein the user may select a current clock time point or a preprogrammed forward clock time point to be the preset time point, wherein when the controller receives the at least one first control signal from the first external control device, the controller operates to switch the light emitting unit from performing the first illumination mode to performing the second illumination mode while simultaneously activates the anytime setting process to establish the preset time point in the memory of the controller for executing a 24-hour recurring process to manage the light emitting unit to automatically convert from performing the first illumination mode to performing the second illumination mode on a daily repetitive basis at each 24-hour cycle time point counting from a former preset time point.

28. The lifestyle lighting device according to claim 27, wherein the preprogrammed forward clock time point for setting the preset time point is implemented by a programmable switch working in conjunction with the first external control device, wherein the programmable switch allows the user to select the delay time $t_D$ or a forward clock time point to be the preset time point for activating the 24-hour recurring program.

29. The lifestyle lighting device according to claim 28, wherein the preset time point is the forward clock time point; wherein the user may decide a desired clock time point to be the preset time point and select a corresponding time length to set the delay time $t_D$ with a programmable timer, wherein the time length of the delay time $t_D$ is the difference between the desired clock time point and the current clock time point.

30. The lifestyle lighting device according to claim 27, wherein the at least one first external control signal for setting the preset time point is a short power interruption signal; wherein a power interruption detection circuit is electrically coupled with the controller and the power source for detecting the short power interruption signal within a predetermined short time interval.

31. The lifestyle lighting device according to claim 30, wherein the short power interruption signal received by the controller is generated by turning off and turning back on a power switch electrically coupled to the controller within a predetermined short time duration, wherein the power switch is used as the first external control device and the short power interruption signal is the at least one first external control signal.

32. The lifestyle lighting device according to claim 27, wherein the at least one first external control signal received by the controller is generated by pushing a push button or pressing a touch pad integrated with the first external control device for a short time duration.

33. The lifestyle lighting device according to claim 22, wherein the time setting algorithm is a fixed time point setting process, wherein the time setting algorithm designed in the controller is programmed to automatically adjust and set the time length of the delay time $t_D$ for continuing the performance of the first illumination mode according to a data base of seasonal time shift detected over a number of days predetermined on a moving average basis such that the light emitting unit is converted from performing the first illumination mode to performing the second illumination mode at a fixed time point.

34. The lifestyle lighting device according to claim 22, wherein the time setting algorithm is a fixed time period setting method, wherein the first external control device is configured with a plurality of selection switches for selecting the time length of the delay time $t_D$, wherein when a relevant switch is selected, a relevant first control signal is generated to activate a relevant time setting process for setting a time length of the delay time $t_D$, wherein the controller operates to continue the performance of the first illumination mode for a time period of the delay time $t_D$, wherein the preset time point is the time point when the delay time $t_D$ matures and the light emitting unit is accordingly converted from performing the first illumination mode to performing the second illumination upon a maturity of the delay time $t_D$, wherein the time length of the fixed time period is counted from the time point when the photo sensor activates the light emitting unit to start performing the first illumination mode till the time point the light emitting unit is converted to performing the second illumination mode.

35. The lifestyle lighting device according to claim 22, wherein the time setting algorithm is a fixed time period setting method, wherein the first external control device is configured with a plurality of selection switches for selecting a time length of the delay time $t_D$, wherein when a relevant switch is selected, a relevant first control signal is generated to activate a relevant time setting process for setting the time length of the delay time $t_D$, wherein the controller operates to continue the performance of the first illumination mode for a time period of the delay time $t_D$, wherein the preset time point is the time point when the fixed delay time $t_D$ matures and the light emitting unit is accordingly converted from performing the first illumination mode to performing the second illumination upon a maturity of the delay time $t_D$, wherein the time length of the fixed time period is counted from a reference clock time point when the user operates to generate a second external control signal to activate a 24-hour cycle time counting process designed in the controller, such that the time setting algorithm so configured is also a fixed clock time timer, wherein the light emitting unit is converted from performing the first illumination mode to performing the second illumination mode at a fixed clock time being equal to the reference clock time plus the time length of the delay time $t_D$.

36. The lifestyle lighting device according to claim 22, wherein the time length of the predetermined time duration for performing the second level illumination is adjustable by operating at least one second external control device electrically coupled with the controller according to the user's lifestyle.

37. The lifestyle lighting device according to claim 22, wherein the first light intensity of the first level illumination is further adjustable by operating at least one second external control device electrically coupled with the controller, wherein the at least one second external control device outputs at least one second external control signal to the controller, wherein the controller responsively operates to synchronously adjust the first conduction rate of the first semiconductor switching device and the second conduction rate of the second semiconductor switching device with the same pace to control the total electric power delivered to the light emitting unit.

38. The lifestyle lighting device according to claim 22, wherein the first light color temperature of the first level illumination is further adjustable by operating at least one second external control device electrically coupled with the controller, wherein the at least one second external control device is configured with a plurality of light color temperature selection switches enabling the user to select the first light color temperature for performing the first illumination mode, wherein when a light color temperature selection switch is selected, a relevant second external control signal is generated to the controller for setting a light color temperature selected, wherein the controller is designed to operate a light color temperature switching scheme comprising a plurality of light color temperature performances, wherein each of the plurality of light color temperature performances is respectively activated by the relevant second external control signal, wherein each of the plurality of light color temperature performances is further operated with a paired combination of the first conduction rate and the second conduction rate respectively for controlling the first semiconductor switching device and the second semiconductor switching device, wherein for performing each of the plurality of light color temperature performances the first control signal and the second control signal are designed to operate with an arrangement that the first conduction rate and the second conduction rate are reversely and complementarily adjusted such that the first light intensity of the light emitting unit is maintained at a constant level while the mingled light is accordingly adjusted according to the first light color temperature selected.

39. The lifestyle lighting device according to claim 22, wherein the second light intensity of the second level illumination is further adjustable by operating at least one second external control device electrically coupled with the controller, wherein the at least one second external control device outputs at least one second external control signal to the controller, wherein the controller responsively operates to adjust the second conduction rate of the second semiconductor switching device to control the total electric power delivered to the light emitting unit.

40. The lifestyle lighting device according to claim 22, wherein the time setting algorithm is a clock timer setting method, wherein a clock timer is installed to provide a current clock time information to the controller;
wherein the first external control device is configured with a plurality of selection switches electrically coupled with the controller for respectively selecting and activating different clock time setting processes, wherein when a relevant switch is selected, a first external control signal is generated to the controller to activate a relevant clock time setting process for setting a preset clock time point, wherein the light emitting unit is converted from performing the first illumination mode to performing the second illumination mode at the preset clock time point.

41. The lifestyle lighting device according to claim 40, wherein the current clock time information is either received from a clock electrically coupled with the controller or received from an external device configured with a clock time counting capacity thru a wireless signal receiver electrically coupled with the controller.

42. The lifestyle lighting device according to claim 40, wherein a second external control device configured with a time setting unit is further installed, wherein the time setting unit enables the user to convert a time counter of the controller into the clock timer by inputting a current clock time information to the time setting unit and simultaneously operates to generate an external control signal to activate a 24-hour cycle time counting process designed in the controller using the inputted current clock time as a starting point to continue the clock time counting.

43. The lifestyle lighting device according to claim 42, wherein the external control signal to activate the 24-hour cycle time counting process is an instant power interruption signal by turning off a power switch and turning back the power switch to on within a predetermined short time interval.

44. A lifestyle lighting device, comprising:
a light emitting unit, configured with a plurality of light emitting diodes;
a loading and power control unit, configured with a controller electrically coupled with a switching circuitry electrically connected between a power source and the light emitting unit for controlling an electric power transmitted to the light emitting unit;
a first external control device electrically coupled with the controller, for generating at least one first external control signal; and
a time setting algorithm, in conjunction with the first external control device for managing the light emitting unit on a clock time basis to perform at least a first illumination mode;
wherein the switching circuitry comprises at least one semiconductor switching device for controlling a transmission of the electric power delivered to the light emitting unit, wherein the controller outputs at least one control signal to control at least a conduction rate of the at least one semiconductor switching device to generate at least an illumination to perform the first illumination mode;
wherein when the controller receives the at least one first external control signal generated by the first external control device, the controller operates the time setting algorithm to determine a preset time point and a delay time $t_D$ selected by a user to perform the first illumination mode;
wherein at dusk the light emitting unit is switched on at the preset time point to perform the first illumination mode for the delay time $t_D$ according to the at least one first external control signal, wherein upon a maturity of the delay time $t_D$, the light emitting unit is switched off and the lifestyle lighting device is reset for performing a next operating cycle on a daily repetitive basis;
wherein the plurality of light emitting diodes and the power source are configured to have a combination of in parallel and/or in series connections such that an electric current passing through each LED of the light emitting unit remains at an adequate level and thus a voltage V across each LED of the light emitting unit complies with an operating constraint of $V_{th} < V < V_{max}$ featuring electrical characteristics of the LED, wherein $V_{th}$ is a threshold voltage required to trigger the LED to start emitting light and $V_{max}$ is a maximum operating voltage across the LED to avoid a thermal damage or burning out a semiconductor structure of the LED construction.

45. The lifestyle lighting device according to claim 44, wherein the time setting algorithm is an anytime point setting process; wherein the user may select a current clock time point to be the preset time point, wherein when the controller receives the at least one first control signal from the first external control device, the controller operates to activate the anytime point setting process to establish the preset time point in the memory of the controller for executing a 24-hour recurring program to manage the LED load to be automatically turned on to perform the first illumination for the delay time $t_D$ on a daily repetitive basis at each 24-hour cycle time point counting from a former preset time point.

46. The lifestyle lighting device according to claim 44, wherein the delay time $t_D$ is implemented by a programmable switch incorporated with the first external control device, wherein the programmable switch allows the user to select a time length of the delay time $t_D$ for continuing the first illumination mode.

47. The lifestyle lighting device according to claim 45, wherein the at least one first external control signal for setting the preset time point is a short power interruption signal; wherein a power interruption detection circuit is electrically coupled with the controller and the power source for detecting the short power interruption signal within a predetermined short time interval.

48. The lifestyle lighting device according to claim 47, wherein the short power interruption signal received by the controller is generated by turning off and turning back on a power switch electrically coupled to the controller within a predetermined short time duration, wherein the power switch is used as the first external control device and the short power interruption signal is the first external control signal.

49. The lifestyle lighting device according to claim 45, wherein the at least one first external control signal for setting the preset time point is generated by pushing a push button or pressing a touch pad integrated with the first external control device.

50. The lifestyle lighting device according to claim 44, wherein the time setting algorithm is a clock timer setting method, wherein a clock timer is installed to provide a current clock time information to the controller;
   wherein the first external control device is configured with a plurality of selection switches electrically coupled with the controller for respectively selecting and activating different clock time setting processes, wherein when a relevant switch is selected, a relevant first external control signal is generated to the controller to activate a relevant clock time setting process for setting a preset clock time point, wherein the light emitting unit is converted from performing the first illumination mode to performing the second illumination mode at the preset clock time point.

51. The lifestyle lighting device according to claim 50, wherein the current clock time information is either received from a clock electrically coupled with the controller or received from an external device configured with a clock time counting capacity thru a wireless signal receiver electrically coupled with the controller.

52. The lifestyle lighting device according to claim 50, wherein a second external control device configured with a time setting unit is further installed, wherein the time setting unit enables the user to convert a time counter of the controller into the clock timer by inputting a current clock time information to the time setting unit and simultaneously operates to generate an external control signal to activate a 24-hour cycle time counting process designed in the controller using the inputted current clock time as a starting point to continue the clock time counting.

53. The lifestyle lighting device according to claim 52, wherein the external control signal to activate the 24-hour cycle time counting process is an instant power interruption signal by turning off a power switch and turning back the power switch back to on within a predetermined short time interval.

54. The lifestyle lighting device according to claim 52, wherein the control signal to activate the 24-hour cycle time counting process for converting the time counter of the controller into the clock timer is generated by pushing a push button or pressing a touch pad integrated with the second external control device.

55. The lifestyle LED lighting device according to claim 1, wherein each LED of the light emitting unit is further configured with a plurality of LED chips, wherein each LED chip is required to operate in a voltage domain ranging from at least 2.5 volts to at most 3.5 volts for a white or blue light LED chip; wherein the 2.5 volts is a threshold voltage $V_{th}$ and the 3.5 volts is a maximum working voltage $V_{max}$; wherein each LED so configured is required to operate with a working voltage V ranging from N×2.5 volts to N×3.5 volts, or N×2.5 volts<V<N×3.5 volts, wherein N, with N=1, 2, 3 . . . , is the number of the LED chips or sets of LED chips being electrically connected in series for forming a packaged LED.

56. The lifestyle lighting device according to claim 44, wherein each LED of the light emitting unit is further configured with a plurality of LED chips, wherein each LED chip is required to operate in a voltage domain ranging from at least 2.5 volts to at most 3.5 volts for a white or blue light LED chip; wherein the 2.5 volts is a threshold voltage $V_{th}$ and the 3.5 volts is a maximum working voltage $V_{max}$; wherein each LED so configured is required to operate with a working voltage V ranging from N×2.5 volts to N×3.5 volts, or N×2.5 volts<V<N×3.5 volts, wherein N, with N=1, 2, 3 . . . , is the number of the LED chips or sets of LED chips being electrically connected in series for forming a packaged LED.

57. The lifestyle lighting device according to claim 22, wherein each LED of the light emitting unit is further configured with a plurality of LED chips, wherein each LED chip is required to operate in a voltage domain ranging from at least 2.5 volts to at most 3.5 volts for a white or blue light LED chip; wherein the 2.5 volts is a threshold voltage $V_{th}$ and the 3.5 volts is a maximum working voltage $V_{max}$; wherein each LED so configured is required to operate with a working voltage V ranging from N×2.5 volts to N×3.5 volts, or N×2.5 volts<V<N×3.5 volts, wherein N, with N=1, 2, 3 . . . , is the number of the LED chips or sets of LED chips being electrically connected in series for forming a packaged LED.

58. A method of configuring a fixed time point timer for operating a lifestyle lighting solution of a light emitting unit, configured with a plurality of light emitting diodes and featured with at least a first illumination mode and at least a second illumination mode being divided at a fixed time point, comprising:
   using a photo sensor to turn on the light emitting unit at dusk and to turn off the light emitting unit at dawn;
   using a controller to trace and update daily time length data between a light-on time at dusk and a light-off time at dawn controlled by the photo sensor for a number of days on a moving average basis to continuously obtain a moving average value T of night time duration due to seasonal effect;
   using a season adjustment algorithm designed in the controller to dynamically adjust a time length of a delay time $t_D$ for performing the first illumination mode and updating the delay time $t_D$ on an on-going basis according to the following formula:

$$t_D = t_0 + (T-12)/2$$

wherein $t_0$ is a fixed length of time delay selected for performing an illumination mode during the seasons when the time length of night time is equal to the time length of day time, wherein T is the moving average of time lengths of night time measured by the on/off performance of the photo sensor between nightfall and daybreak;

wherein the controller accordingly uses a season adjusted value of $t_D$ to dynamically control the time length of the delay time $t_D$ for performing the first illumination mode until being converted to the second illumination mode at the fixed time point;

using the controller to control at least a conduction rate of at least one semiconductor switching device of a switching circuitry electrically connected between a power source and the light emitting unit to determine an electric power transmitted to the light emitting unit for generating different light intensities respectively for performing at least the first illumination mode and the second illumination mode;

using a configuration of in series and in parallel connections for constructing the plurality of light emitting diodes of the light emitting unit such that when incorporated with the power source an electric current passing through each LED of the light emitting unit remains at an adequate level such that a voltage V across each LED of the light emitting unit complies with an operating constraint of $V_{th}<V<V_{max}$ featuring electrical characteristics of the LED, wherein $V_{th}$ is a threshold voltage required to trigger the LED to start emitting light and $V_{max}$ is a maximum operating voltage across the LED to avoid a thermal damage or burning out a semiconductor structure of the LED construction;

wherein at dusk the light emitting unit is switched on to perform the first illumination mode with a first level illumination for the delay time $t_D$ and upon a maturity of the delay time $t_D$ the light emitting unit is converted to perform the second illumination mode with a second level illumination, wherein the second level illumination is either a turned off state or a low level state with a reduced light intensity, the second illumination mode continues till daybreak when the photo sensor operates to switch off the light emitting unit and the controller is resumed for performing next operating cycle, wherein the season adjusted time delay $t_D$ enables the light emitting unit to be converted from performing the first illumination mode to performing the second illumination mode at the fixed time point.

59. The method of configuring a fixed time point timer according to claim 58, wherein the method further includes using a first external control device electrically coupled with the controller to enable a user to select a $t_0$ for setting the fixed time point to convert the light emitting unit from performing the first illumination mode to performing the second illumination mode, wherein the first external control device comprises a plurality of switches for selecting and activating different fixed time point processes, wherein when a relevant switch is selected, a relevant first voltage signal is generated to activate a relevant fixed time point process to dynamically adjust the length of the time delay to according to the seasonal shift of night length such that the light emitting unit is converted from performing the first illumination mode to performing the second illumination mode at the fixed time point selected.

60. The method of configuring a fixed time point timer according to claim 58, wherein a motion sensor is further installed to connect to the controller to perform the lifestyle lighting solution; wherein at dusk the light emitting unit is switched on by the photo sensor to perform the first illumination mode with the motion sensor being temporarily deactivated, the first illumination mode with the first level illumination continues for the delay time $t_D$ till the light emitting unit is converted to perform the second illumination mode with the second level illumination, wherein the light emitting unit is switched either to the turned off state or to the low level state with a reduced light intensity and with the motion sensor being activated to detect any motion intrusion, wherein whenever a motion is detected by the motion sensor, the controller immediately and responsively manages to increase the electric power transmitted to the light emitting unit to perform a third illumination mode with a third level illumination for a predetermined time duration before resetting back to the turned off state or the low level state in the absence of any succeeding motion intrusion.

61. The method of configuring a fixed time point timer according to claim 60, wherein a light intensity of the third level illumination is equal to or higher than a light intensity of the first level illumination.

62. The method of configuring a fixed time point timer according to claim 58, wherein a motion sensor is further connected to the controller, wherein the first illumination mode is a first motion sensing illumination mode and the second illumination mode is a second motion sensing illumination mode; wherein at dusk the light emitting unit is turned on by the photo sensor to perform the first illumination mode with the first level illumination, wherein during the first illumination mode when a motion intrusion is detected by the motion sensor, the controller instantly manages to increase the electric power delivered to the light emitting unit to generate a high level illumination for a predetermined time duration before resetting to the first level illumination, wherein at the time point when the time counting of the fixed time point timer ends, the light emitting unit is converted to perform the second illumination mode with the second level illumination, wherein the second level illumination is the turned off state or the low level state, wherein when the motion intrusion is detected during the second illumination mode, the controller instantly manages to increase the electric power to the light emitting unit to generate the high level illumination for the predetermined time duration before resetting to the turned off state or the low level state, the second illumination mode continues till daybreak when the photo sensor operates to switch off the light emitting unit and the controller is resumed for performing next operating cycle, wherein the season adjusted time delay $t_D$ enables the light emitting unit to be converted from performing the first illumination mode to performing the second illumination mode at the fixed time point.

63. The method of configuring a fixed time point timer according to claim 62, wherein the light intensity of the first level illumination is further adjustable by at least one second external control device electrically coupled with the controller to output at least one second external control signal to the controller for adjusting the at least one semiconductor switching device to control the electric power delivered to the light emitting unit.

64. A method of configuring an anytime setting timer for operating a lifestyle lighting solution of a light emitting unit, configured with a plurality of light emitting diodes and featured with at least a first illumination mode and a second illumination mode being divided at a clock time point selected by a user, comprising:

using a photo sensor, for automatically switching on the light emitting unit at dusk and switching off the light emitting unit at dawn;

using an external control device electrically coupled to a controller to generate an external control signal for activating the anytime setting timer and selecting the anytime point to convert from performing the first illumination mode to performing the second illumination mode;

using an anytime setting algorithm to operate the anytime setting timer, wherein at a selected clock time point when the user operates the external control device to generate the external control signal received by the controller, the controller operates to promptly convert the light emitting unit from performing the first illumination mode to performing the second illumination mode and at the same time records the clock time point for repetitive performance on a daily basis until another external control signal is produced by the at least one external control device and is received by the controller for changing the selected clock time point, wherein at dusk the light emitting unit is turned on automatically by the photo sensor to perform the first illumination mode until reaching the selected clock time point to convert to perform the second illumination mode and at dawn the light emitting unit is turned off with the controller being reset for the next operating cycle;

using the controller to control at least a conduction rate of at least one semiconductor switching device of a switching circuitry electrically connected between a power source and the light emitting unit configured with a plurality of light emitting diodes to control an electric power transmitted to the light emitting unit for generating different light intensities respectively for performing at least the first illumination mode and the second illumination mode;

using a configuration of in series and in parallel connections for constructing the plurality of light emitting diodes of the light emitting unit such that when incorporated with the power source an electric current passing through each LED of the light emitting unit remains at an adequate level such that a voltage V across each LED of the light emitting unit complies with an operating constraint of $V_{th}<V<V_{max}$ featuring electrical characteristics of the LED, wherein $V_{th}$ is a threshold voltage required to trigger the LED to start emitting light and $V_{max}$ is a maximum operating voltage across the LED to avoid a thermal damage or burning out a semiconductor structure of the light emitting unit.

65. The method of configuring an anytime setting timer according to claim 64, wherein for setting and operating the anytime setting timer a power switch connected in series between the power source and the controller can be instantly switched off and switched back to on for creating an instant interruption of power supply with a duration of power interruption being shorter than a preset time interval, wherein the controller detects the instant interruption of electric power and interprets it as the external control signal for activating the anytime setting algorithm of the anytime setting process designed in the controller.

66. The method of configuring an anytime setting timer according claim 64, wherein the anytime setting process is a repetitive 24-hour cycle time counting process, wherein whenever the external control signal is generated to trigger the anytime setting process at the selected clock time point, the controller operates to activate the 24-hour cycle time counting process to repetitively identify each 24-hour cycle time point of the selected clock time point on a daily basis, wherein each time when the 24-hour cycle time counting is completed the controller manages to repetitively switch the light emitting unit from performing the first illumination mode to performing the second illumination mode.

67. The method of configuring an anytime setting timer according to claim 64, wherein a motion sensor is further installed to connect to the controller to operate the lifestyle lighting solution; wherein at dusk the light emitting unit is switched on by the photo sensor to perform the first illumination mode with the motion sensor being temporarily deactivated, the first illumination mode with a first level illumination continues until reaching the selected clock time point according to the anytime point setting timer, the light emitting unit is then converted to perform the second illumination mode with a second level illumination and the motion sensor is activated, wherein the second level illumination is a turned off state or a low level state with a reduced light intensity, wherein whenever a motion is detected by the motion sensor, the controller immediately and responsively manages to increase the electric power transmitted to the light emitting unit to perform a third illumination mode with a third level illumination for a predetermined time duration before resetting back to the turned off state or the low level state in the absence of any succeeding motion intrusion.

68. The method of configuring an anytime setting timer according to claim 67, wherein the light intensity of the third level illumination is equal to or higher than the light intensity of the first level illumination.

69. The method of configuring an anytime setting timer according to claim 64, wherein a motion sensor is further connected to the controller, wherein the first illumination mode is a first motion sensing illumination mode and the second illumination mode is a second motion sensing illumination mode; wherein at dusk the light emitting unit is turned on by the photo sensor to perform the first illumination mode with a first level illumination, wherein during the first illumination mode when a motion intrusion is detected by the motion sensor, the controller instantly manages to increase the electric power delivered to the light emitting unit to generate a high level illumination for a predetermined time duration before resetting to the first level illumination, the first illumination mode continues until reaching the selected clock time point according to the anytime point setting timer, the light emitting unit is then converted to perform the second illumination mode, wherein the controller manages to reduce the electric power delivered to the light emitting unit to generate a second level illumination, wherein the second level illumination is a turned off state or a low level state with a reduced light intensity, wherein during the second illumination mode when the motion intrusion is detected by the motion sensor, the controller instantly manages to increase the electric power delivered to the light emitting unit to generate the high level illumination for the predetermined time duration before resetting to the turned off state or the low level state, wherein at dawn the light emitting unit is switched off by the photo sensor.

70. A method of configuring a lifestyle lighting solution with a fixed time period timer for controlling a lighting performance of a light emitting unit configured with a plurality of light emitting diodes comprising:

using a photo sensor to automatically switch on the light emitting unit at dusk to perform a first illumination mode and automatically switch off the light emitting unit at dawn;

using an external control device configured with a plurality of switches, electrically coupled to a controller, for respectively selecting and activating different delay time processes, wherein when a relevant switch is selected, a relevant voltage signal is generated to the controller to activate a relevant delay time $t_D$ process for selecting a time length of a delay time $t_D$ for performing the lifestyle lighting solution;

using the controller to receive the relevant voltage signal generated by the external control device operated by a user to execute the relevant delay time $t_D$ process to convert the light emitting unit from performing the first illumination mode with a first level illumination to performing a second illumination mode with a second level illumination at a time point when the time counting of the time length of the delay time $t_D$ ends;

using the controller to control at least a conduction rate of at least one semiconductor switching device of a switching circuitry electrically connected between a power source and the light emitting unit to control an electric power transmitted to the light emitting unit for generating different light intensities respectively for performing at least the first illumination mode and the second illumination mode, wherein the second level illumination is either a turned off state with a zero light intensity or a low level state with a reduced light intensity;

using a configuration of in series and or in parallel connections for constructing the plurality of light emitting diodes of the light emitting unit such that when incorporated with an adequate level of the power source an electric current passing through each LED of the light emitting unit remains at an adequate level such that a voltage V across each LED of the light emitting unit complies with an operating constraint of $V_{th}<V<V_{max}$ featuring electrical characteristics of the LED, wherein $V_{th}$ is a threshold voltage required to trigger the LED to start emitting light and $V_{max}$ is a maximum operating voltage across the LED to avoid a thermal damage or burning out a semiconductor structure of the LED construction.

71. The method of configuring a lifestyle lighting solution with a fixed time period timer according to claim 70, wherein the time length of the delay time $t_D$ for continuing the first illumination mode is counted from the time point of night fall when the photo sensor operates to turn on the light emitting unit until the time point when the light emitting unit is converted from performing the first illumination mode to performing the second illumination mode, such that the timer so configured is a fixed time period timer.

72. The method of configuring a lifestyle lighting solution with a fixed time period timer according to claim 70, wherein the time length of the delay time $t_D$ for continuing the first illumination mode is counted from a reference clock time point when the user operates to generate a second external control signal to activate a 24-hour cycle time counting process designed in the controller, such that the timer so configured is also a fixed clock time timer, wherein the light emitting unit is converted from performing the first illumination mode to performing the second illumination mode at a fixed clock time being equal to the reference clock time plus the time length of the delay time $t_D$.

73. The method of configuring a lifestyle lighting solution with a fixed time period timer according to claim 70, wherein a motion sensor is further installed to connect to the controller to operate the lifestyle lighting solution; wherein at dusk the light emitting unit is switched on by the photo sensor to perform the first illumination mode with the motion sensor being temporarily deactivated, the first illumination mode with the first level illumination continues until the time counting of the time length of the delay time $t_D$ ends, the light emitting unit is then converted to perform the second illumination mode with the second level illumination and the motion sensor is activated, wherein the second level illumination is the turned off state or the low level state, wherein whenever a motion is detected by the motion sensor, the controller immediately and responsively manages to increase the electric power transmitted to the light emitting unit to perform a third illumination mode with a third level illumination for a predetermined time duration before resetting back to the turned off state or the low level state in the absence of any succeeding motion intrusion.

74. The method of configuring a lifestyle lighting solution with a fixed time period timer according to claim 72, wherein a light intensity of the third level illumination is equal to or higher than a light intensity of the first level illumination.

75. The method of configuring a lifestyle lighting solution with a fixed time period timer according to claim 70, wherein a motion sensor is further connected to the controller, wherein the first illumination mode is a first motion sensing illumination mode and the second illumination mode is a second motion sensing illumination mode; wherein at dusk the light emitting unit is turned on by the photo sensor to perform the first illumination mode with the first level illumination, wherein during the first illumination mode when a motion intrusion is detected by the motion sensor, the controller instantly manages to increase the electric power delivered to the light emitting unit to perform a high level illumination for a predetermined time duration before resetting to the first level illumination, the first illumination mode continues until the time counting of the time length of the delay time $t_D$ ends, the light emitting unit is then converted to perform the second illumination mode, wherein the controller manages to reduce the electric power delivered to the light emitting unit to generate the second level illumination, wherein the light intensity of the second level illumination is lower than the light intensity of the first level illumination, wherein during the second illumination mode when the motion intrusion is detected by the motion sensor, the controller instantly manages to increase the electric power delivered to the light emitting unit to perform the high level illumination for the predetermined time duration before resetting to the turned off state or the low level state, wherein at dawn the light emitting unit is switched off by the photo sensor.

76. A method of configuring a lifestyle lighting solution with a clock timer for controlling a lighting performance of a light emitting unit, comprising:

using a photo sensor to switch on the light emitting at dusk to perform a first illumination mode and switch off the light emitting unit at dawn;

using a clock to provide a current clock time information to a controller;

using a first external control device configured with a plurality of selection switches, electrically coupled to the controller for respectively selecting and activating different clock time setting processes, wherein when a relevant switch is selected, a relevant first external control signal is generated to the controller to activate a relevant clock time setting process for performing the lifestyle lighting solution;

using the controller to receive the first external control signal generated by the first external control device operated by a user to convert the light emitting unit from performing the first illumination mode with a first level illumination to performing a second illumination mode with a second level illumination at a time point when the selected clock time is due according to the clock time information provided by the clock;

using the controller to control at least a conduction rate of at least one semiconductor switching device of a switching circuitry electrically connected between a power source and the light emitting unit to determine an average electric power transmitted to the light emitting unit for generating different light intensities respectively for performing at least the first illumination mode and the second illumination mode;

using a configuration of in series and in parallel connections for constructing the plurality of light emitting diodes such that when incorporated with an adequate level of the power source an electric current passing through each LED of the light emitting unit remains at an adequate level such that a voltage V across each LED of the light emitting unit complies with an operating constraint of $V_{th} < V < V_{max}$ featuring electrical characteristics of the LED, wherein $V_{th}$ is a threshold voltage required to trigger the LED to start emitting light and $V_{max}$ is a maximum operating voltage across the LED to avoid a thermal damage or burning out a semiconductor structure of the LED construction;

wherein at dusk the light emitting unit is switched on to perform the first illumination mode with the first level illumination, wherein when the selected clock time is due according to the clock time information from the clock timer, the controller accordingly operates to convert the light emitting unit from performing the first illumination mode with the first illumination level to performing the second illumination mode with the second illumination level, wherein the second level illumination is a turned off state with a zero light intensity or a low level state with a reduced light intensity, wherein at dawn the light emitting unit is switched off by the photo sensor.

77. The method of configuring a lifestyle lighting solution with a clock timer according to claim 76, wherein the clock time information is either received from a clock electrically coupled with the controller or received from a mobile device configured with a clock time capacity thru a wireless signal receiver electrically coupled with the controller.

78. The method of configuring a lifestyle lighting solution with a clock timer according to claim 77, wherein the wireless signal receiver is a Wi-Fi wireless signal, a Blue Tooth wireless signal or a RF (radio frequency) wireless signal.

79. The method of configuring a lifestyle lighting solution with a clock timer according to claim 77, wherein the controller includes a memory for saving or installing an APP (application program preloaded) or a software program for interpreting and executing the wireless signal received, wherein the APP is downloaded from an internet or a cloud server for updating the memory of the controller.

80. The method of configuring a lifestyle lighting solution with a clock timer according to claim 76, wherein the clock is performed by a second external control device configured with a time setting unit, wherein the time setting unit enables the user to convert a time counter of the controller into the cock timer by inputting a current clock time information to the time setting unit and simultaneously generating an external control signal to activate a 24-hour cycle time counting process designed in the controller using the inputted current clock time as the starting point to continue the cock time counting.

81. The method of configuring a lifestyle lighting solution with a clock timer according to claim 80, wherein the external control signal to activate the 24-hour cycle time counting process is an instant power interruption signal generated by turning off a power switch and turning the power switch back to on within a predetermined short time interval.

82. A method of converting a time counter of a controller into a clock timer, comprising:

using a time setting unit operable by a user for inputting a current clock time information to the controller electrically coupled with the time setting unit;

using an external control device electrically coupled with the controller to generate a control signal to activate a 24-hour cycle time counting process designed in the controller upon inputting the current clock time information and using the inputted current clock time as the starting point to continue the clock time counting;

using the controller configured with a clock time conversion process to convert the time counter of the controller into a clock timer upon receiving the current clock time information from the time setting unit and the control signal from the external control device for activating the clock time conversion process.

83. The method of converting a time counter of a controller into a clock timer according to claim 82, wherein the external control device is a power switch electrically connected between a power source and the light emitting unit, wherein when the power switch is instantly turned off and turned back to on within a short predetermined time interval, a short power interruption signal is generated as the control signal for activating the 24-hour cycle time counting process.

84. The method of converting a time counter of a controller into a clock timer according to claim 82, wherein the time setting unit is configured with a plurality of preset clock time points for user's selection, wherein when a preset clock time point is selected, the user is required to wait for the due time of the selected preset clock time point to operate the external control device to generate the control signal for activating the 24-hour cycle time counting process.

* * * * *